United States Patent [19]

Sugahara et al.

[11] 4,188,268

[45] Feb. 12, 1980

[54] PROCESS FOR AN ELECTRODE FOR A LEAD BATTERY

[75] Inventors: Yujiro Sugahara, Tokyo; Yoshibumi Noshi, Tsuruoka; Hiroyuki Naito, Tsuruoka; Akira Takahashi, Tsuruoka; Masanori Ito, Amarume; Hisashi Tuchida, Tsuruoka, all of Japan

[73] Assignee: Mizusawa Kagaku Kogyo Kabushiki Kaisha, Osaka, Japan

[21] Appl. No.: 919,047

[22] Filed: Jun. 26, 1978

[51] Int. Cl.² ............................................. H01M 10/44
[52] U.S. Cl. ...................................... 204/2.1; 429/228
[58] Field of Search ........................ 204/2.1, 53, 114; 429/225–228

[56] References Cited

U.S. PATENT DOCUMENTS

| | | | |
|---|---|---|---|
| 3,909,292 | 9/1975 | Sekido et al. | 204/2.1 |
| 4,117,104 | 9/1978 | Sugahara et al. | 423/619 |

Primary Examiner—Charles F. Lefevour
Attorney, Agent, or Firm—Sherman & Shalloway

[57] ABSTRACT

A lead battery comprising as an active material a formation product of a novel lead monoxide or a heat treatment product thereof is disclosed. This novel lead monoxide has a true density of 8.3 to 9.2 g/cc, an average particle size not larger than 0.2μ, an infrared absorption peak at a wave number of 1400 to 1410 cm$^{-1}$ and a chromic anhydride reactivity of at least 94%.

This lead battery is excellent over lead batterys comprising active materials formed from known starting substances with respect to the active material utilization ratio and it has a very long life and stable capacities. In this lead battery, the active material utilization ratio can be maintained at a very high level over a long period.

10 Claims, 12 Drawing Figures

PROCESS FOR AN ELECTRODE FOR A LEAD BATTERY

BACKGROUND OF THE INVENTION (1) Field of the Invention

The present invention relates to a lead battery comprising as an active material a formation product of novel lead monoxide or its calcination product or a sulfuric acid paste thereof.

(2) Brief Description of the Prior Art

As the starting substance of an active material of a lead battery, there have heretofore been used so-called lead powder, litharge and minium. These starting substances of active materials have heretofore been commercially manufactured in the form of lead powder according to the ball mill method developed by Mr. Genzo Shimazu in 1925 or according to the molten flow method. According to the bal mill method, granules of metallic lead having a size of 20 to 25 mm are charged in a tube mill and air is blown into the tube. By friction and oxidation with oxygen in air, which is accompanied by generation of heat, so-called lead powder is peeled off from surfaces of the granules of metallic lead. According to the molten flow method, molten lead is introduced into a Barton pot and is violently agitated by agitating blades while supplying air, to effect oxidation, and fine powder of a mixture of lead oxide and metallic lead is recordered.

So-called lead powder obtained according to the above-mentioned methods is also called "lead suboxide" and in general, it has a composition represented by the following formula:

$$PbO_x$$

in which x is a number of from 0.3 to 0.7. It is said that the lead powder is a composite or mixture of lead monoxide of the tetragonal system and metallic lead. This lead powder is most popularly used as the starting substance of an active material of a lead battery, and it is said that the lead powder is most excellent in properties among substances to be used for manufacture of active materials of lead batterys.

Also litharge (lead monoxide of the rhombic system) is broadly used as the starting substance of an active material of a lead battery. This lead monoxide is obtained by blowing oxygen or air into lead powder (lead suboxide powder) obtained according to the abovementioned methods and heating and oxidizing the lead powder at about 600° C. Further, minium ($Pb_3O_4$) is used as the starting substance of an active material. This lead oxide is prepared by blowing air into the above-mentioned lead powder and heating and oxidizing it at about 450° C.

As will be apparent from the foregoing illustration, each of starting substances of active materials of lead batterys is prepared from metallic lead by dry oxidation thereof. These starting substances are still insufficient in the preparation process and in properties and characteristics.

In the art handling lead, it is very important that the working environment or living environment is not contaminated with lead dusts. If this requirement is not satisfied, it is not possible to conduct the preparation of lead compounds. In the steps of the above-mentioned process for manufacture of lead powder, gases containing lead dusts should inevitably be formed and discharged, and at the step of calcination oxidation of lead powder to litharge or minium, high temperature exhaust gases containing lead dusts should inevitably be generated. Accordingly, expensive dust precipitators should be disposed to collect lead dusts from these exhaust gases. Further, even if such dust collecting operation is conducted, it is difficult to collect lead dusts completely, and therefore, the problem of preventing the environmental pollution is left unsolved.

Further, each of conventional starting substances of active materials, such as lead monoxide and minium, has such a large particle size that the average primary particle size is in the range of from 1 to 10µ, and it is not sufficiently satisfactory in the ratio (based on PbO) of utilization of an active material.

It has been desired to develop a lead battery having a high capacity and a light weight as a pollution-free battery for an automobile or operation car or for load levelling of power.

BRIEF SUMMARY OF THE INVENTION

We previously found that when granules of metallic lead are filled in a rotary mill together with a liquid medium and oxygen and the rotary mill is rotated under such conditions that at least parts of the granules of metallic lead wetted with the liquid medium are located in the gas phase above the liquid level and friction is caused among the granules of metallic lead through the liquid medium, a slurry containing ultrafine particles of lead monoxide can be obtained at such a high oxidation speed as not expected from the amount of oxygen dissolved in the liquid medium.

It also was found that lead monoxide prepared according to the above-mentioned method is prominently different from known starting substances of active materials of lead batterys with respect to physical and chemical properties, and that when this novel lead monoxide or a calcination product thereof is used as a starting substance of an active material of a lead battery, a much higher ratio of utilization of the active material can be obtained than in case of active materials of lead batterys prepared from known starting substances.

It is therefore a primary object of the present invention to provide a lead battery including an active material prepared from novel lead monoxide or a calcination product thereof and a process for the manufacture of such lead battery.

Another object of the present invention is to provide a lead battery including an active material prepared from novel lead monoxide formed by the wet method and having an ultrafine primary particle size or a calcination product thereof and a process for the manufacture of such lead battery.

Still another object of the present invention is to provide a lead battery which is prominently excellent over known lead batterys with respect to the active material utilization ratio.

A further object of the present invention is to provide a lead battery in which the active material utilization ratio can be maintained at a high level over a very long period and which has a long life and stable capacities.

A still further object of the present invention is to provide a process for the manufacture of lead batterys in which the formation treatment can be accomplished with a much smaller quantity of electricity or electric power (integrated power) than in the case where known starting substances of active materials are used.

A still further object of the present invention to provide a process for the manufacture of lead batterys in which a starting substance of an active material can be pasted in a much broader range than in the case where known starting substances of active materials are used.

In accordance with the fundamental aspect of the present invention, there is provided a lead battery comprising as an active material a formation product of lead monoxide or a sulfuric acid paste thereof, said lead monoxide being a lead monoxide having a true density of 8.3 to 9.2 g/cc, an average particle size not larger than $0.2\mu$, an infrared absorption peak at a wave number of 1400 to 1410 cm$^{-1}$ and a chromic anhydride reactivity of at least 94% or a heat treatment product thereof.

DETAILED DESCRIPTION OF THE INVENTION

Process for Preparation of Starting Substance of Active Material

The starting substance that is used for formation of an active material of the lead battery of the present invention is prepared by a process comprising charging granules of metallic lead, a liquid medium and oxygen in a rotary mill, rotating the rotary mill under such conditions that at least parts of the metallic lead granules wetted with the liquid medium are located in the gas phase above the level of the liquid medium and friction is caused among the metallic granules through the liquid medium, to thereby form a dispersion of very fine particles of lead monoxide in the liquid medium, separating the dispersion from the metallic lead granules, and if desired, recovering the thus formed lead monoxide in the form of a fine powder from said dispersion.

Figure 1:
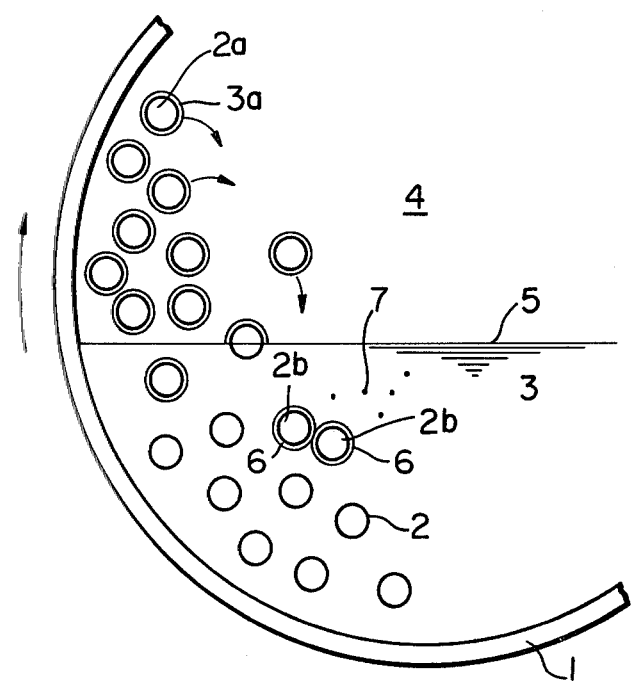
FIG. 1 is a diagram illustrating the principle of the process for preparation of lead monoxide to be use for the manufacture of the lead battery of the present invention.

Referring now to FIG. 1 illustrating the principle of the preparation process of this invention, metallic lead granules 2, liquid medium 3 and oxygen 4 are charged in a rotary mill 1, and the rotary mill 1 is rotated in a prescribed direction indicated by an arrow, namely in the clockwise direction in FIG. 1. The amounts charged of the respective substances and the peripheral rotation speed of the rotary mill 1 are controlled so that parts 2a of metallic granules having the surface wetted with the liquid medium are exposed into the gas phase 4 above the liquid level 5 and friction is caused among the metallic lead granules 2 through the liquid medium 3.

It is believed that the following mechanism is closely associated with the feature that according to the above process novel lead monoxide of the very fine particulate form can be obtained at such a high conversion as not expected from the amount of oxygen dissolved in the liquid medium, though not limited by this mechanism.

(1) At first, with rotation of the rotary mill 1 the metallic lead granules 2 are raised along the circumferential wall of the mill 1 and become exposed to the gas phase 4 above the liquid level 5, and this layers 3a of the liquid medium 3 are formed on the surfaces of the metallic lead granules 2a exposed to the gas phase 4. Oxygen gas 4 in the gas phase 4 is readily absorbed in the thin layers 3a of the liquid medium 3 and oxidizes promptly the surfaces of the metallic lead granules 2a to form very thin film layers 6 of lead monoxide on the surfaces of the metallic lead granules 2a.

(2) Metallic granules 2b having very thin layers 6 of lead monoxide formed on the surfaces thereof are rubbed with one another through the liquid medium 3 and lead monoxide in the form of the very thin film layer 6 is dispersed into the liquid medium 3 in the form of a very fine particle 7 by this friction. At this point, the liquid medium 3 has an action of inducting and dispersing selectively very fine particles of lead monoxide into the liquid medium 3 from the surfaces of the metallic lead granules with friction among the metallic lead granules.

(3) Since lead monoxide film layers 6 thus formed are perpetually removed from the metallic lead granules 2b by mutual friction of the granules through the liquid medium, the surfaces of the metallic lead granules are always kept in the fresh and highly active state.

(4) The unit steps (1) to (3) are repeated on the metallic lead granules 2 having fresh surfaces.

In other words, this reaction system is characterized in that (1) absorption of oxygen through a so-called wetted wall and subsequent oxidation of surfaces of metallic lead granules and (2) mutual friction of metallic lead granules having oxide films formed on the surfaces thereof through the liquid medium are frequently repeated in a very short cycle.

In the above-mentioned reaction system, since the metallic lead granules 2a having the surfaces wetted with the liquid medium are perpetually exposed to the gas phase above the liquid level 5, it is believed that the gas-liquid contact area A is remarkably increased over the case where metallic lead granules are agitated below the liquid level and oxygen is blown into the liquid medium and that since the metallic lead granules and the liquid medium are agitated by rotation of the mill 1, increase of the gas-liquid contact area A is further enhanced. It is also believed that since the layer 3a formed on the surface of the metallic lead granule is very thin and the gas phase and wetted metallic lead granules are violently agitated, interfacial films participating in migration of substances on both the gas phase and liquid phase sides are made thinner, resulting in remarkable increase of the absorption speed constant.

Thus, the reasons why such a high oxidation speed as not expected from the amount of oxygen dissolved in the liquid medium can be attained according to the above process will be apparent.

Another factor influencing the speed of oxidation of metallic lead is a surface condition of a metallic lead granule. More specifically, in the case where an oxide film is formed on the surface of granular metallic lead, the granules are rendered passive and the oxidation speed is remarkably reduced. In the above process, however, it is possible to rub violently metallic lead granules having very thin oxide films by mutual friction through the liquid medium and lead monoxide formed can be dispersed and separated very promptly into the liquid medium to render the surfaces of the metallic lead granules fresh and active, whereby the speed of oxidation of metallic lead can be remarkably enhanced.

The feature that lead monoxide formed on the surface of the metallic lead granule in the form of a very thin film is dispersed into the liquid medium by mutual friction of the metallic lead granules results in great advantages as regards not only the conversion but also the selectivity. For example, if granular metallic lead is maintained in the surface-wetted state in an oxidizing atmosphere for a long time, the conversion is reduced and formation of lead oxides other than lead monoxide, such as minium ($Pb_3O_4$) and/or lead peroxide ($PbO_2$), is enhanced to reduce the selectivity to lead monoxide drastically. In this case, the properties of the resulting oxide products are very bad. According to this process as illustrated in Examples given hereinafter, the selectivity to lead monoxide is generally at least 95%, especially at least 97%, and the resulting lead monoxide is excellent in the properties required of a starting substance of an active material of a lead battery.

Furthermore, the feature that oxidation of metallic lead is performed through the liquid medium and mutual friction of metallic lead granules is conducted through the liquid medium produce the following additional advantages:

(a) Precise control of the oxidation speed is possible and the oxide film formed on the surface of granular metallic lead can be made very thin.

(b) The liquid medium has an action of uniformalizing the oxidation temperature in the entire system and the oxidation temperature can be controlled to a very low level with the aid of the above advantage (a).

(c) The liquid medium has a much higher activity of inducing and dispersing very fine particles of lead monoxide from the surfaces of the metallic lead granules than a gaseous medium.

(d) Lead monoxide formed in the form of a very thin film can be separated from the granular metallic lead and can be stored and accumulated in the system in the form of a suspension until the concentration is elevated to a remarkably high level.

(i) In this process, the solid-liquid ratio ($R_{SL}$) defined by the following formula:

$$R_{SL} = W/V_1 \quad (1)$$

wherein $V_1$ is a volume (l) of the liquid medium in the rotary mill and W is an amount (Kg) of granular metallic lead in the rotary mill, is also an important factor for preparing a starting substance of an active material having novel properties. in a high yield and at a high selectivity.

In general, it is preferred that the above solid-liquid ratio $R_{SL}$ by adjusted within a range of from 1 to 100 Kg/l, especially from 1 to 50 Kg/l.

(ii) Further, the gas-liquid ratio ($R_{GL}$) defined by the following formula:

$$R_{GL} = V_2/V_1 \quad (2)$$

in which $V_1$ is a volume (l) of the liquid medium in the rotary mill and $V_2$ is a volume (l) of the space of the gas phase oxygen, is also an important factor for preparing a starting substance for an active material having novel properties in a high yield and at a high selectivity. In general, it is preferred that this gas-liquid ratio ($R_{GL}$) be at least 0.05, especially within a range of from 0.2 to 120, particularly especially up to 60.

(iii) In order to perform effectively mutual friction of metallic lead granules and attain a high agitation effect in the reaction system, it is preferred that the packed volume ratio $R_V$ defined by the following formula:

$$R_V = B/V_o \quad (3)$$

in which B is a bulk volume of metallic lead granules packed in the rotary mill and $V_o$ is an inner volume of the rotary mill, be within a range of from 0.05 to 0.4, especially from 0.06 to 0.3.

(iv) Still further, in order to manifest the above-mentioned activities (1) and (2) effectively, it is important to adjust the rotation speed of the rotary mill appropriately. More specifically, it is preferred that the rotary mill be rotated at a rotation number corresponding to 20 to 150%, especially 25 to 125%, of the critical rotation number ($N_C$, rpm) defined by the following formula:

$$N_C = 42.27/\sqrt{D} \quad (4)$$

in which D denotes an inner diameter (m) of the rotary mill.

When the rotary mill is rotated at a rotation number larger than 150% of the critical rotation number, the yield of lead monoxide, namely the conversion to lead monoxide, is rather reduced, and adoption of such a large rotation number is not preferred because of wasteful consumption of energy.

Incidentally, the above critical rotation number ($N_C$) is a value theoretically determined on granules having in contact with the inner wall face of the rotary mill. Accordingly, even when the rotation number is larger than this critical rotation number, granules which have separated from the inner wall face of the rotary mill are once lifted up and when the granules are set free from the influence of the centrifugal force, they are let to fall by the gravity. In fact, by the naked eye observation we confirmed that if the rotary mill is rotated at a rotation number within the above range, granules of metallic lead fall violently on the liquid level to cause bubbling in the liquid.

A rotary mill provided with lifting plates on the inner peripheral wall may be used so as to disperse water-wetted metallic lead granules uniformly in the gas phase in the rotary mill.

According to the above process, by charging metallic lead granules, a liquid medium and oxygen in a rotary mill so that the above specific quantitative relationships are established and rotating the rotary mill at a rotation number within the above range, the oxygen absorption speed constant [Ka, g·hr$^{-1}$·l$^{-1}$·(Kg/cm$^2$)$^{-1}$] defined by the following formula:

$$Ka = Uo/(P \times V) \qquad (5)$$

in which Uo is an amount of oxygen consumed per unit time (g/hr) calculated from the amount of lead monoxide formed per unit time, V is an inner volume (l) of the rotary mill, and P is a partial pressure (Kg/cm$^2$ absolute) of oxygen in the gas phase in the rotary mill, can be elevated to at least 0.05, especially at least 0.1.

Any of spherical granules, elliptical granules, columnar granules, prismatic granules, cubic granules, granules of other polyhedral forms, granules of rod-like forms, granules of gravel-like forms and amorphous granules can be used as granules of metallic lead. However, in order to perform mutual friction of the granules effectively in the liquid medium, it is preferred that granules having a large volume per unit surface area, namely a heavy weight, such as spherical and elliptical granules, be used. It has been found that in this invention, even when the form of the granular metallic lead charged is indefinite to some extent, if rotation is continued in the rotary mill, the form of the granules is changed to a substantially spherical form by the plasticity of lead. The average size of the granular metallic lead to be charged to the reaction system can be changed within a range of 0.5 to 7 mm. In general, the conversion can be effectively improved when the size of the granules is reduced to increase the surface area per unit weight of lead charged. However, if the size of the granules is too small, a high friction effect is attained in the liquid medium and the granules become massive by cohesion, and therefore, it is impossible to form wetted walls on respective granules effectively. In this invention, it is preferred that the average size of the granular metallic lead be within a range of from 0.5 to 7 mm, especially from 1 to 5 mm. Granules of metallic lead can be prepared by known methods, for example, casting, extrusion, spraying, scattering and granulation in water.

Not only as-prepared granular metallic lead having a fresh outer surface but also granular metallic lead which has been allowed to stand still and which is rendered passive by a thin film of lead oxide, basic lead carbonate or the like formed on the outer surface thereof can be used for the preparation of lead monoxide. When ordinary lead monoxide is prepared, it is possible to use any of the above-mentioned two types of lead granules, but when it is intended to prepare lead monoxide of the hydrate type, it is preferred to use granular metallic lead having a fresh metal surface. Metallic lead granules which have been rendered passive can easily be converted to granules having fresh metal surfaces by treatment with dilute acetic acid, nitric acid, hydrochloric acid or the like. In order to obtain lead monoxide excellent in the hue, it is preferred to use granules having fresh metal surfaces. It has been found that the fresh surface state can be kept for a long time if metallic lead granules having fresh metal surfaces are completely immersed in stagnant water.

In the above process, any of liquid media capable of dissolving oxygen therein and substantially inactive with metallic lead and formed lead monoxide can be used. For example, there can be used aqueous media, polar organic solvents, e.g., alcohols such as methanol, ethanol, butanol, glycerin, ethylene glycol, propylene glycol and diacetone alcohol, ethers such as diethyl ether, dioxane, tetrahydrofuran and cellosolves, ketones such as methylethyl ketone, acetone, hexanone and isophorone, esters such as ethyl acetate and amyl acetate, amides such as dimethylformamide and dimethylacetamide, sulfoxides such as dimethylsulfoxide and amines such as pyridine and dimethylaniline, and non-polar organic solvents, e.g., benzene, toluene, xylene, tetralin, dipentane, isoparaffin, heptane, trichlene, perchlene, chloroform, methylene chloride and carbon tetrachloride.

In the above, it is preferred to use polar solvents, especially water and aqueous media such as mixtures of water with water-miscible polar organic solvents such as mentioned above. Water is a stable liquid medium which is available at a cheapest cost and water is excellent in the property of dissolving oxygen therein. Further, water has a high activity of inducing and dispersing formed lead monoxide in the very fine particulate state, and when water is used as the liquid medium, a dispersion of lead monoxide formed can be recovered in a stable state and at a high lead monoxide concentration. Accordingly, use of water as the liquid medium is most preferred. Further, use of water produces an advantage that the temperature of the treatment system can be changed within a relatively broad range. It is desirable to use water singly as the liquid medium, but if desired, a water-miscible organic solvent such as an alcohol, an ether and a ketone can be used together with water in an amount of up to 50 parts by volume, especially up to 40 parts by volume, per 100 parts by volume of water.

In the above process, the reaction proceeds smoothly even in the absence of a catalyst. However, in order to adjust the conversion of metallic lead to lead monoxide per unit time or control the crystal form of the resulting lead monoxide, various catalysts may be added to the liquid medium. As the catalyst, there can be mentioned, for example, (1) acids, e.g., inorganic acids such as nitric acid and organic acids such as acetic acid, (2) alkaline agents, e.g., ammonia, alkali metal hydroxides such as sodium hydroxide, alkaline earth metal hydroxides, and organic bases such as amines, and (3) salts such as ammonium nitrate, ammonium acetate, quaternary ammonium salts and acid addition salts of amines, but catalysts that can be used in this invention are not limited to those recited above. The amount added of the catalyst is not particularly critical in this invention. In general, the catalyst may be present in the liquid medium in an amount of $5 \times 10^{-4}$ to 5% by weight based on the liquid medium, especially 0.01 to 3% by weight based on the liquid medium.

Molecular oxygen alone or a mixture of molecular oxygen with an inert gas can be used for oxidizing metallic lead in the above process. As the inert gas, there can be mentioned, for example, nitrogen, helium and argon. In order to increase the solubility of oxygen in the liquid medium, it is preferred to use pure oxygen gas, but in this invention, better results are obtained when a gaseous mixture comprising 1 mole of oxygen and up to 10 moles, especially up to 5 moles, of an inert gas such as nitrogen is employed. Accordingly, in the above process, decarbonated air or a mixture of decarbonated air and oxygen can be used in this invention. The pressure of oxygen or an oxygen-containing gas that is used in this invention may be atmospheric, but it is generally preferred that the pressure of oxygen or the oxygen-containing gas be elevated to at least 0.2 Kg/cm$^2$ (absolute), especially to 1 to 10 Kg/cm$^2$ (absolute). In order to enhance the speed of absorption of oxygen into the liquid medium, it is preferred to increase the partial pressure of oxygen in the gas phase.

In the above process, the temperature of the reaction system, especially the temperature of the liquid medium, is not particularly critical, so far as the temperature is higher than the melting point of the liquid medium used and lower than the boiling point thereof under the inner total pressure. Of course, oxidation reaction of metallic lead is an exothermic reaction. Accordingly, if the milling treatment is conducted batchwise for a long time, the temperature is gradually elevated. Preferred temperatures differ to some extent depending on the intended crystal form of lead monoxide, but in general, it is preferred that the temperature be maintained within a range of from $-5°$ to $90°$ C. especially from $0°$ to $70°$ C. When the temperature of the liquid medium is relatively high, the theoretical oxygen absorption constant (k) tends to decrease, and the selectivity is often reduced and the hue of the resulting lead monoxide is degraded in some case. Accordingly, in practising the process of this invention, it is preferred that the reaction system be cooled directly or the liquid medium to be fed to the reaction system be cooled in advance.

In the above process, the oxidation may be conducted batchwise or in a continuous manner. For example, prescribed amounts of granular metallic lead, a liquid medium and oxygen or an oxygen-containing gas are charged into the above-mentioned rotary mill and the reaction can be conducted batchwise. In this case, oxygen or the oxygen-containing gas may be fed into the rotary mill intermittently or continuously. Alternately, prescribed amounts of granular metallic lead and the liquid medium are charged in the rotary mill, and then, oxygen or the oxygen-containing gas and the liquid medium are fed intermittently or continuously while a slurry containing ultrafine particles of lead monoxide is withdrawn intermittently or continuously. In this continuous method, the granules of metallic lead may be charged into the rotary mill intermittently or continuously.

The residence time of the liquid medium in the reaction system, the time for contact of the liquid medium with metallic lead granules under mutual friction through the liquid medium, is not particularly critical in this invention. In the above process, lead monoxide fromed according to the above-mentioned mechanism is exfoliated and dispersed in the liquid medium in a short time, but when the contact time is too short, only a dispersion (slurry) having a very low lead monoxide concentration is formed. Accordingly, it is generally preferred that the contact time be adjusted to at least 0.5 minute, especially 1 to 20 minutes. Of course, even when the residence time of the liquid medium in the reaction system is lower than the above range, a concentrated dispersion can be obtained by recycling the dispersion of a low concentration recovered from the reaction system, to the reaction system directly or after it has been cooled. If lead monoxide formed is made resident in the reaction system for too long a time, the hue of the product is degraded or the selectivity is reduced. Accordingly, in the above process, it is not preferred to make formed lead monoxide resident in the reaction system for too long a time.

In view of the operation facility, it is preferred that the concentration of lead monoxide in the slurry to be recovered from the reaction system be 0.1 to 35 g/100 cc, especially 0.3 to 20 g/100 cc. It is one of significant advantage of the above process that a slurry of lead monoxide having such a high concentration can be recovered.

Accordingly, ultrafine particles of lead monoxide are exfoliated and dispersed in the liquid medium and a dispersion of these ultrafine particles is formed. Separation of this lead monoxide dispersion from the metallic lead granules can be accomplished very easily only be withdrawing the dispersion from the reaction system. It is another advantage of the above process that this separation can be accomplished without particularly adopting any solid-liquid separation operation, for example, filtration, centifugal separation, decantation or spray drying. Furthermore, it is very advantageous that the thus recovered dispersion is substantially free of metallic lead or other impurities. Of course, in the case where the size of metallic lead granules is drastically reduced, incorporation of ultrafine particles of metallic lead into the recovered lead monoxide dispersion can be completely prevented by passing the dispersion through a separator such as a liquid cyclone.

The separated dispersion or slurry may be used as it is or in the form of a wet cake as the starting substance for production of an active material of a lead battery, but if desired, ultrafine particles of lead monoxide can be separated in the form of powder from the slurry, and used for production of an active material. For example, the lead monoxide is first recovered in the form of a cake by sedimentation, centrifugal separation, decantation, filtration, electrophoresis, spray drying or the like and a powdery product for production of an active material can be obtained by drying this cake.

Addition of an acid, a base or a salt thereof, or a coagulant to the dispersion in effective for accelerating flocculation and sedimentation of ultrafine particles of lead monoxide.

According to the above-mentioned process, there can be attained an advantage that ultrafine particles of novel lead monoxide can be obtained according to the wet method without generation of an exhaust gas containing lead dusts or a waste liquid containing soluble lead salts.

Properties of Starting Substance of Active Material

Since the starting substance that is used for formation of an active material in the present invention is prepared according to the above-mentioned specific wet process, it has novel characteristics properties that are not observed in conventional starting substances of active materials of lead batterys.

Lead monoxide to be used in the present invention can be clearly distinguished from known lead monoxides in the point that it has a true density of 8.3 to 9.2 g/cc, preferably 8.35 to 9.18 g/cc. For example, Gmerin's Hanbuch teaches that known yellow PbO of the rhombic system has a density of 9.63 g/cc and known red PbO of the tetragonal system has a density of 9.34 g/cc. The values are almost in agreement with the results of our measurement of densities of known lead monoxides shown in Comparative Examples. As will be apparent from Examples given hereinafter, the lead monoxide to be used in the present invention has a considerably lower true density than known lead monoxides. This suggests that in the lead monoxide to be used in the present invention the atomic distance between lead and oxygen atoms is larger than in known lead monoxides.

It is believed that the reason why the ultrafine lead monoxide prepared according to the above wet process can have a density in such a broad range as of from 8.3 to 9.2 g/cc is that the density is changed depending on the crystal form or the mixing state of crystal forms.

In the instant specification, by the term "litharge type lead monoxide" is meant a lead monoxide having X-ray diffraction peaks substantially corresponding to the following X-ray diffraction pattern:

Table 1

| Lattice Spacing d (Å) | Relative Intensity (I/Io) |
|---|---|
| 5.03 | 7.2 |
| 3.11 | 100 |
| 2.81 | 38.6 |
| 2.51 | 20.5 |
| 1.98 | 29.8 |
| 1.67 | 25.5 |
| 1.55 | 10.0 |
| 1.54 | 14.2 |

Further, in the instant specification, by the expression "substantially corresponding" is meant the fact that each of values of the relative intensity of peaks of lead monoxide of this invention may be changed from the value given above within a range of ±2%.

By the term "massicot type lead monoxide" used herein is meant a lead monoxide having X-ray diffraction peaks substantially corresponding to the following X-ray diffraction pattern:

Table 2

| Lattice Spacing d (Å) | Relative Intensity (I/Io) |
|---|---|
| 3.07 | 30.5 |
| 2.95 | 100 |
| 2.74 | 7.4 |
| 2.38 | 5.2 |

By the term "hydrate type lead monoxide" used herein is meant a lead monoxide having X-ray diffraction peaks substantially corresponding to the following X-ray diffraction pattern:

Table 3

| Lattice Spacing d (Å) | Relative Intensity (I/Io) |
|---|---|
| 3.62 | 100 |
| 3.38 | 34.6 |
| 3.14 | 11.6 |
| 3.05 | 74.3 |
| 2.95 | 11.6 |
| 2.91 | 17.1 |
| 2.86 | 75.6 |
| 2.55 | 34.9 |
| 2.46 | 21.1 |
| 2.33 | 20.4 | or a composition composed mainly of this lead monoxide and containing a small amount of the litharge type lead monoxide and/or the massicot type lead monoxide.

Lead monoxide of the above-mentioned litharge type crystal structure has a density of 8.80 to 9.17 g/cc, lead monoxide of the massicot type crystal structure has a density of 8.35 to 9.2 g/cc, and lead monoxide of the hydrate type crystal structure has a density of 8.80 to 9.1 g/cc.

Figure 2:
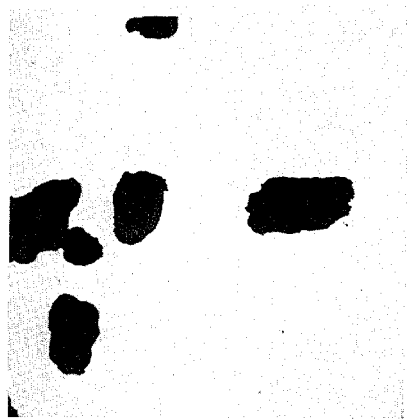
FIG. 2 is an electron microscope photograph of known PbO of the rhombic system.
Figure 3:
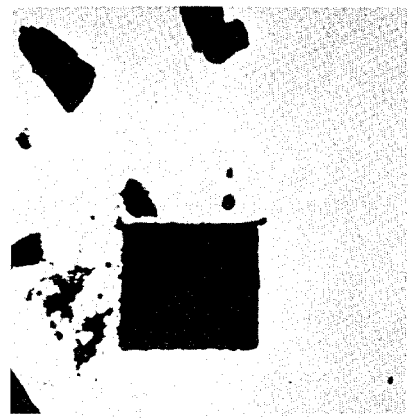
FIG. 3 is an electron microscope photograph of known PbO of the tetragonal system.
Figure 4:
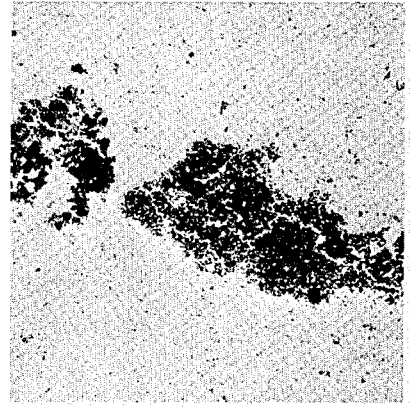
FIG. 4 is an electron microscope photograph of novel litharge tape lead monoxide to be used in the present invention.
Figure 5:
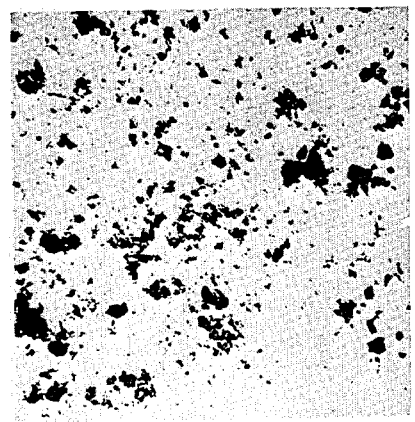
FIG. 5 is an electron microscope photograph of another type novel lead monoxide to be used in the present invention.
Figure 6:
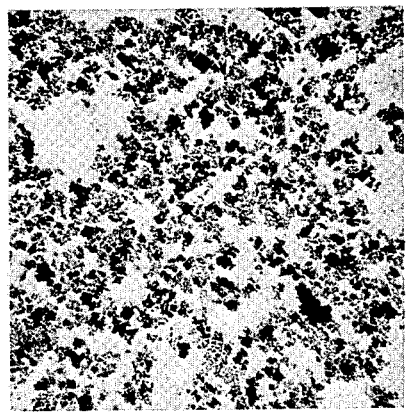
FIG. 6 is an electron microscope photograph of still another type novel lead monoxide to be used in the present invention.

Lead monoxide of this invention generally has a primary particle size not larger than $0.2\mu$, especially not larger than $0.1\mu$. From FIG. 2 which is an electron microscope photograph of known yellow PbO of the rhombic system, it is seen that the primary particles size of this known lead monoxide is in the range of from 2 to $5\mu$. Further, from FIG. 3 which is an electron microscopic photograph of known red lead monoxide of the tetragonal system, it is seen that the primary particle size of this known lead monoxide is in the range of from 3 to $5\mu$. In contrast, lead monoxide to be used in the present invention has a much finer primary particle size. More specifically, as will be apparent from FIG. 4 which is an electron microscope photograph of an instance of novel lead monoxide (litharge type lead monoxide of S-1 of Referential Example 1 given hereinafter), FIG. 5 which is an electron microscope photograph of another instance of novel lead monoxide (massicot type lead monoxide of S-4 of Referential Example 2 given hereinafter) and FIG. 6 which is an electron microscope photograph of still another instance of novel lead monoxide of this invention (hydrate type lead monoxide of S-3 of Referential Example 2 given hereinafter), the primary particle size of litharge type lead monoxide to be used in the present invention is 0.01 to $0.05\mu$, that of massicot type lead monoxide is 0.01 to $0.05\mu$, and that of hydrate type lead monoxide is also 0.01 to $0.05\mu$.

Figure 7:
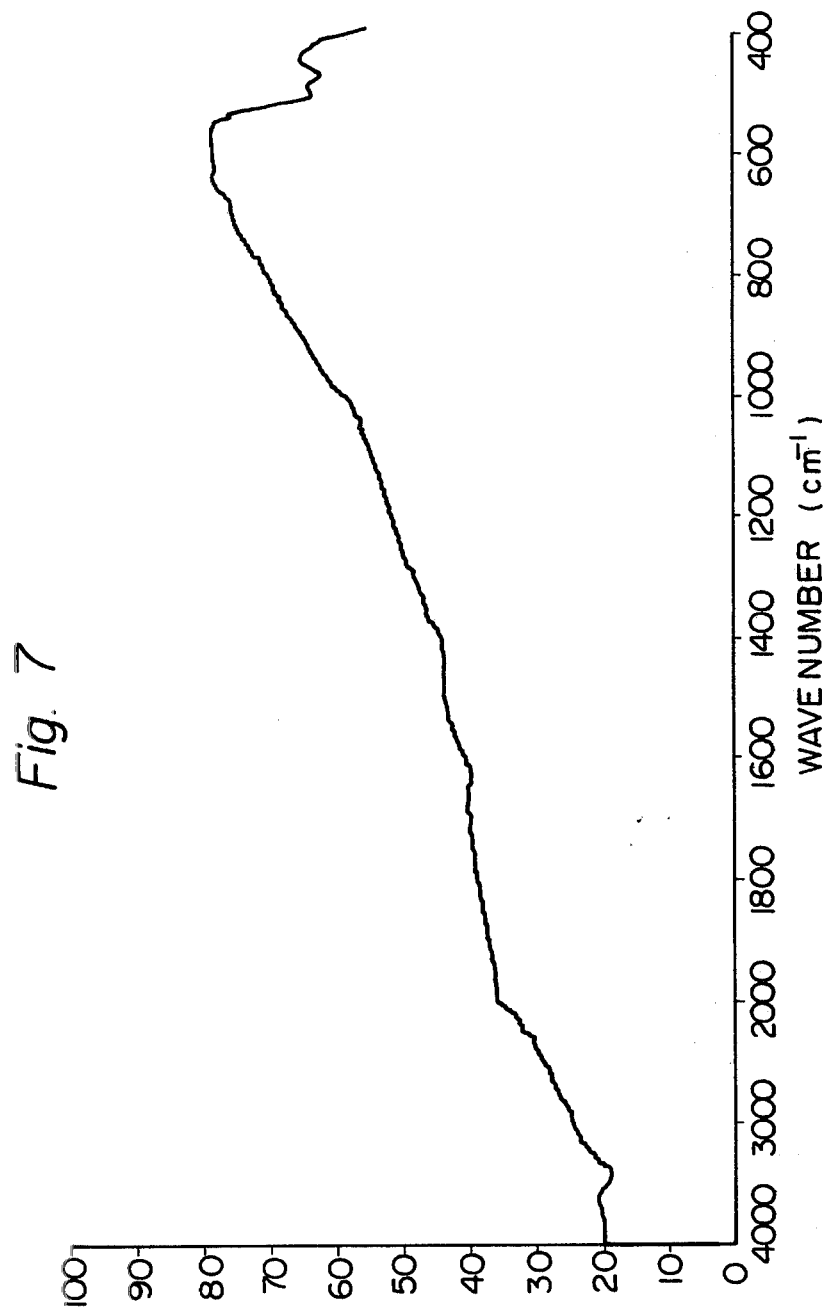
FIG. 7 is an IR absorption spectrum of known yellow PbO of the rhombic system.
Figure 8:
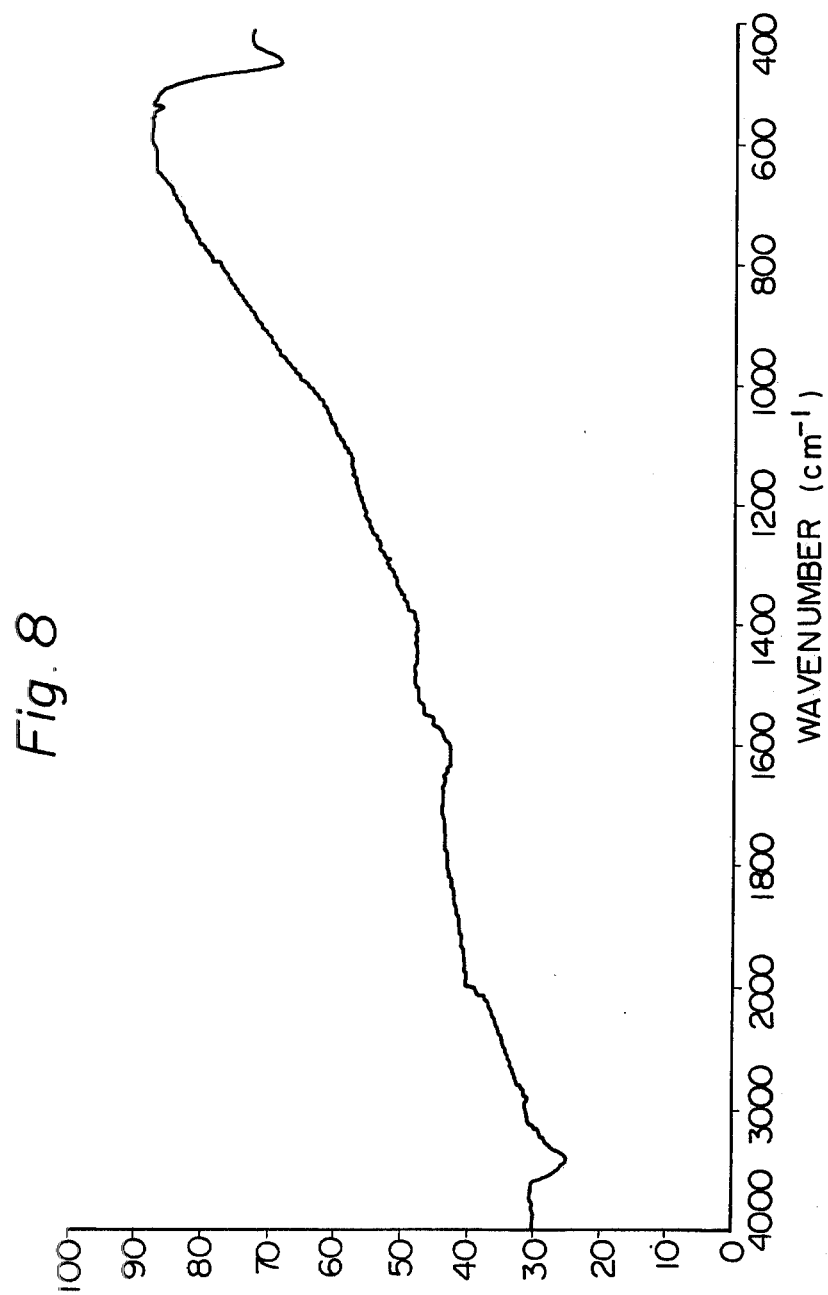
FIG. 8 is an IR absorption spectrum of known red PbO of the tetragonal system.
Figure 9:
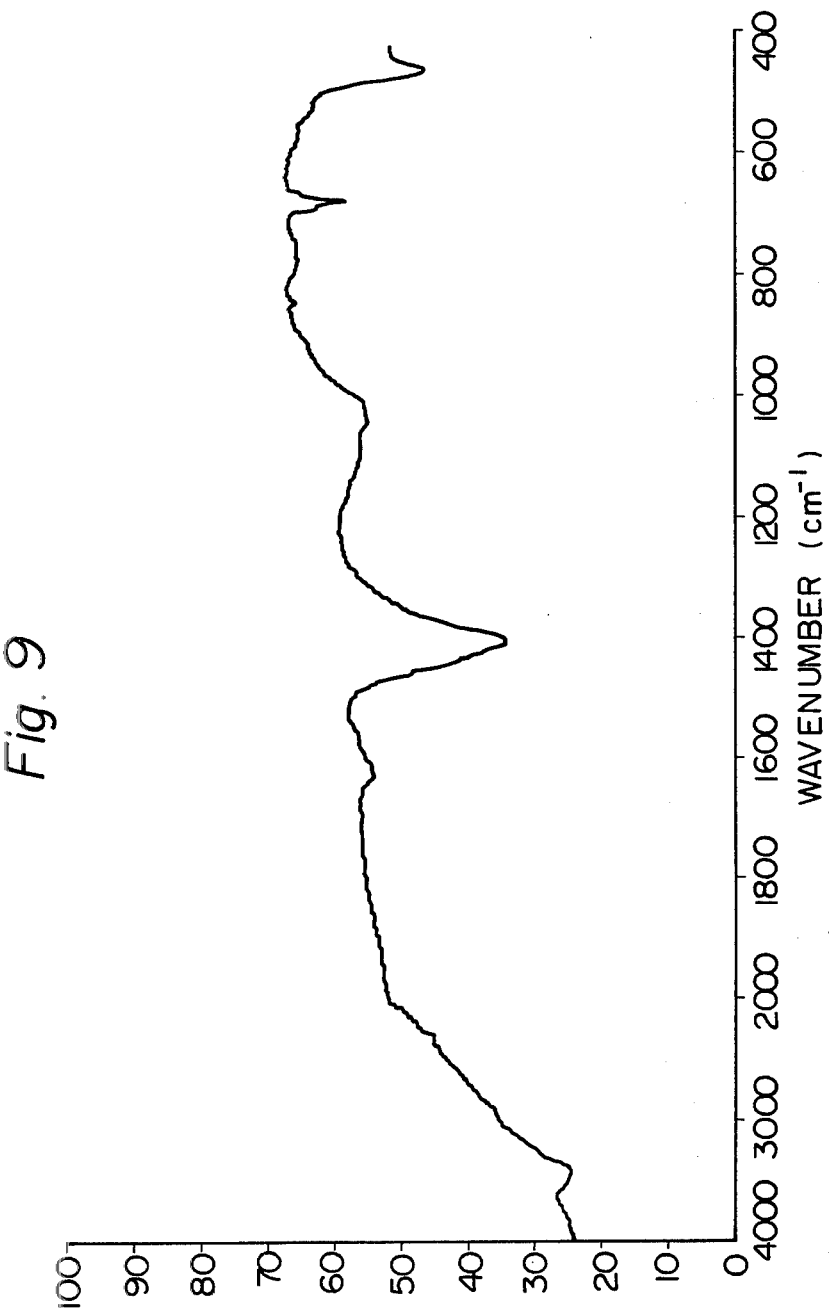
FIG. 9 is an IR absorption spectrum of the litharge type lead monoxide to be used in the present invention.
Figure 10:
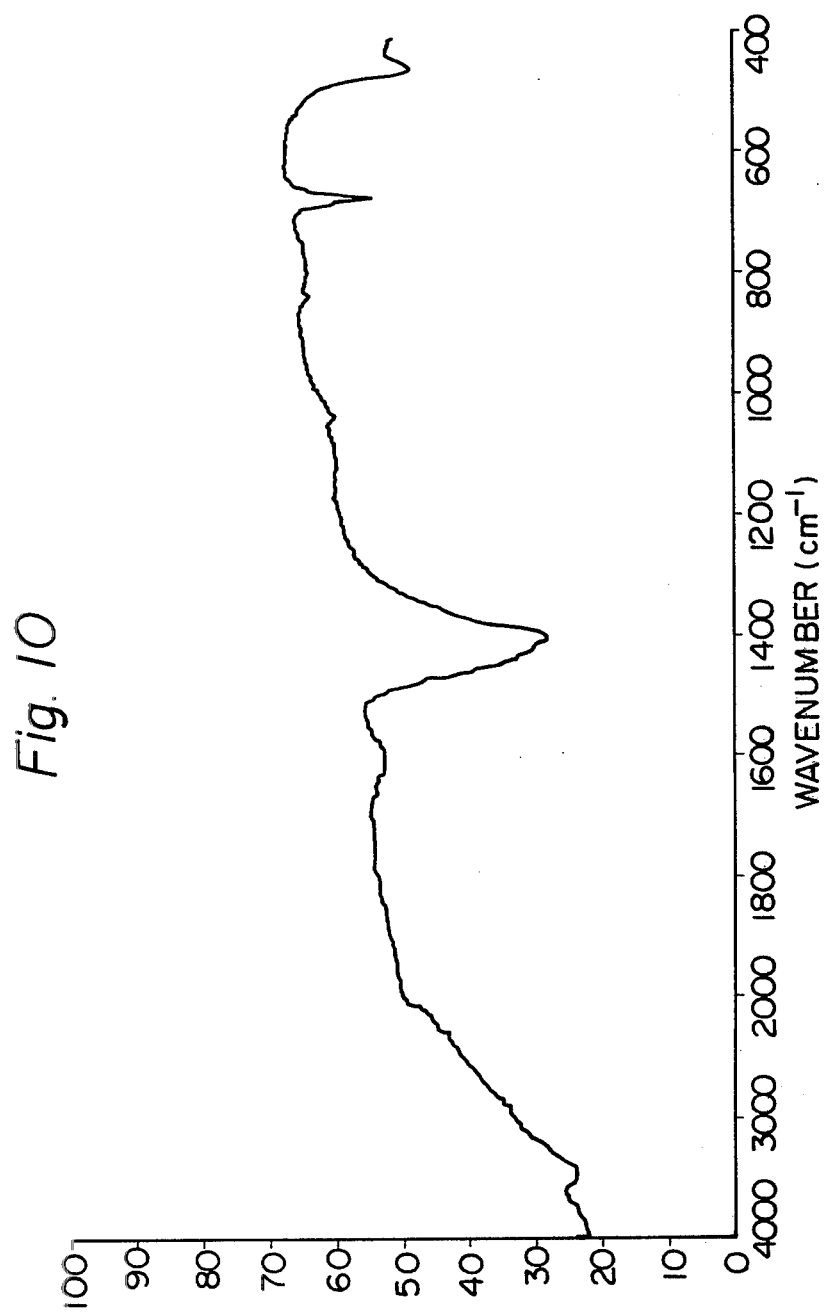
FIG. 10 is an IR absorption spectrum of the massicot type lead monoxide to be used in the present invention.
Figure 11:
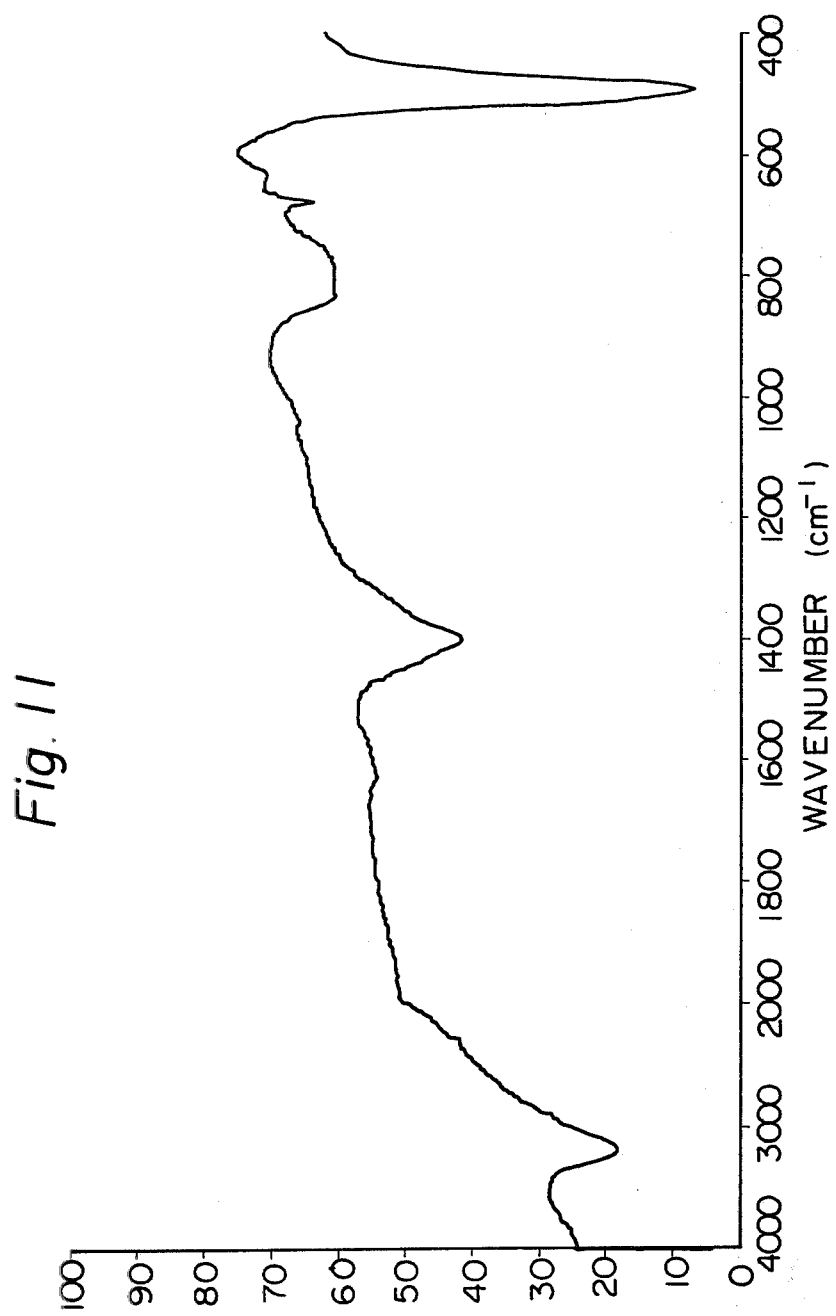
FIG. 11 is an IR absorption spectrum of the hydrate type lead monoxide to be used in the present invention.

The novel lead monoxide to be used in the present invention is further characterized in that it has an infrared (IR) absorption peak at a wave number of 1400 to 1410 cm$^{-1}$. As will be apparent from FIG. 7 illustrating the IR absorption spectrum of known yellow PbO of the rhombic system and FIG. 8 illustrating the IR absorption spectrum of known red PbO of the tetragonal system, any of the known lead monoxides has not substantially an absorption peak at a wave number of 1400 to 1410 cm$^{-1}$. In contrast, as will be apparent from FIG. 9 illustrating the IR absorption spectrum of litharge type lead monoxide to be used in the present invention (S-1 of Referential Example 1), FIG. 10 illustrating the IR absorption spectrum of massicot type lead monoxide to be used in the present invention (S-4 of Referential Example 2) and FIG. 11 illustrating the IR absorption spectrum of hydrate type lead monoxide to be used in the present invention (S-3 of Referential Example 3), each type of lead monoxides to be used in the present invention has a prominent peak at a wave number of 1400 to 1410 cm$^{-1}$. Further, from comparison of FIGS. 7 and 8 with FIGS. 9 to 11, it will also be apparent that lead monoxide to be used in the present invention has a sharp absorption at a wave number of about 680 cm$^{-1}$, which is another characteristic of lead monoxide to be used in the present invention.

As a lead compound having IR absorption peaks at wave numbers of about 1400 cm$^{-1}$ and about 680 cm$^{-1}$, there is known so-called lead carbonate. However, lead monoxide to be used in the present invention is clearly distinguished from this lead carbonate. More specifically, each of lead monoxides mentioned above is one prepared in the reaction system from which carbon dioxide was completely excluded under such reaction conditions that no lead carbonate could be formed. Further, the lead monoxides prepared according to the above-mentioned wet process are substantially free of IR absorption peaks inherent of lead carbonate, for example, peaks at wave numbers of 840, 1052 and 1732 cm$^{-1}$, and they have an IR absorption peak at a wave number of about 490 cm$^{-1}$, which is not observed at all in the IR absorption spectrum of lead carbonate. Accordingly, it can be said that the above-mentioned two absorption peaks are absorption peaks inherent of the novel lead monoxide prepared by the above specific wet process.

The ultrafine lead monoxide to be used in the present invention can also be distinguished from known lead monoxides in the point that the lead monoxide to be used in the present invention has a chromic anhydride reactivity of at least 94% preferably at least 96%. The term "chromic anhydride reactivity (RC)" used herein means a value defined by the following formula:

$$RC\ (\%) = (AC/TC) \times 100 \qquad (6)$$

wherein AC denotes the quantitative analysis value (g) of CrO$_3$ in a product (lead chromate) obtained by reacting lead monoxide with chromic anhydride at a molar ratio of 1:1 in water in the absence of a catalyst at 60° to 70° C. and TC denotes a theoretical value (g) of CrO$_3$ to be contained in the product, namely the amount of chromic anhydride added.

A higher value of the chromic anhydride reactivity indicates that reaction is performed more effectively.

Known lead monoxides generally have a chromic anhydride reactivity ranging from 40 to 80%, though the value varies to some extent according to the preparation method. Accordingly, they are very poor in the reactivity. In contrast, the above-mentioned novel lead monoxide has such a high reactivity as cannot be expected from the values RC of known lead monoxides, and it has an RC value of for example, 99.9%.

The ultrafine lead monoxide by the wet process can take any of the above-mentioned litharge, massicot and hydrate type crystal forms according to the preparation conditions. The litharge type lead monoxide has a hue of a light yellow (light lemon) to orange color which varies depending on the preparation conditions. From the fact that orange litharge type lead monoxide produces a minute amount of dark turbidity when dissolved in acetic acid, it has been confirmed that it contains a minute amount of lead peroxide and/or minium. It has also been confirmed that light lemon litharge type lead monoxide is substantially free of lead peroxide or minium. The novel litharge type lead monoxide resembles known red PbO of the tetragonal system in the point that it has substantially the above-mentioned X-ray diffraction pattern shown in Table 1. The novel litharge type lead monoxide can be clearly distinguished from this known PbO by the above-mentioned various characteristics, and it is different from the known PbO also in the point that the novel litharge type lead monoxide has a light yellow hue, whereas the known PbO has a sharp scarlet hue.

The novel massicot type lead monoxide having substantially the above-mentioned X-ray diffraction pattern shown in Table 2 generally has a yellow hue, and it is not particularly different from the known yellow PbO of the rhombic system with respect to the hue and the X-ray diffraction pattern, but it can be clearly distinguished from the known yellow PbO with respect to the above-mentioned various characteristics, From the fact that the novel hydrate type lead monoxide having substantially the above-mentioned X-ray diffraction pattern shown in Table 3 has a white hue and it is transformed into massicot type lead monoxide when dried completely, it has been identified as hydrous lead monoxide. In the novel lead monoxide of this type, the content of hydrate water is 0.2 to 0.8 mole, especially 0.3 to 0.5 mole, per mole of PbO.

Litharge type lead monoxide can be prepared most easily under the above-mentioned reaction conditions among the above-mentioned lead monoxides. For example, it can readily be prepared under an oxygen pressure of 0.2 to 6 Kg/cm$^2$ (absolute) at a temperature of $-5°$ to 60° C. for a residence time of 5 to 60 minutes in the absence or presence of a catalyst.

Massicot type lead monoxide can be prepared, for example, under an oxygen pressure of at least 1 Kg/cm$^2$ (absolute) in the presence of 0.001 to 8 g/cc, based on the liquid medium, of acetic acid as a catalyst by using water as the liquid medium.

Further, hydrate type lead monoxide can be prepared by using metallic lead granules having fresh metal surfaces, water as the liquid medium and acetic acid or ammonium nitrate as a catalyst and by adopting a relatively low reaction temperature, for example, $-5°$ to 30° C.

Since the above-mentioned peculiar preparation process is adopted, there is attained an advantage that the metallic lead content is remarkably reduced in the novel ultrafine lead monoxide to be used in the present invention. Lead monoxide prepared from lead suboxide according to the so-called lead powder method has a metallic lead content of an order of 0.01 to 3 % as expressed as the acetic acid-insoluble component content. In contrast, in the ultrafine lead monoxide to be used in the present invention, the metallic lead content is so low that the presence of metallic lead can hardly be analytically confirmed.

The ultrafine wet process lead monoxide to be used in the present invention is further characterized in that it has a very fine primary particle size. In the present invention, secondary particles comprising primary particles agglomerated to various degrees may be used. The lead monoxide can have a secondary particle size of 0.2 to 5000μ, especially 0.3 to 2000μ. Further, a mixture of secondary particles differing in the size may be used in the present invention. In order to enhance the utilization ratio of the active material, it is especially preferred to use as the starting substance of an active material a novel lead monoxide having such a secondary particle size distribution that particles having a secondary particle size of 0.3 to 100μ occupy at least 25% by weight, particularly at least 30% by weight, of the total particles.

As the starting substance of an active material, the ultrafine wet process lead monoxide may be used as it is prepared, namely in the state where it has not been subjected to any heat treatment. Alternately, the novel lead monoxide may be used after it has been subjected to an appropriate heat treatment. The heat treatment may be conducted, for example, at 30° to 450° C. or 500° to 850° C. for 0.5 to 120 minutes, especially at 90° to 400° C. for 0.5 to 60 minutes, in a single stage or in a multi-staged manner. In this case, from the viewpoint of the active material utilization ratio, it is preferred that the heat treatment be carried out at a temperature not allowing substantial formation of minium, especially at 30° to 450° C. or 600° to 850° C. Of course, even if transformation of the crystal form is caused by this heat treatment, no disadvantage is brought about at all. If desired, the untreated wet process ultrafine lead monoxide (A) may be used in combination with the heat-treated product (B) thereof, for example, at an (A)/(B) mixing weight ratio of from 10/90 to 99/1, especially from 30/70 to 70/30.

Preparation of Lead Battery

The lead battery of the present invention can be prepared according to any of known means so far as the above-mentioned novel ultrafine lead monoxide prepared according to the above specific wet process is used as the starting substance of an active material.

For example, in case of a paste battery, the above-mentioned novel ultrafine wet process lead monoxide is kneaded with sulfuric acid to form a sulfuric acid paste, this paste is charged in a grid, the formation treatment is carried out to form plates, and assembling is conducted before or after this formation treatment, whereby the intended paste battery can be prepared.

According to the present invention, by virtue of the feature that the novel ultrafine wet process lead monoxide is used as the starting substance of an active material, there is attained an advantage that the pasting range can be much broadened over the pasting range attainable when known lead monoxides are used.

According to the present invention, pasting can be performed within a primary pasting region defined by the following empirical formulae:

$$y \leq 1820x^2 - 3694x + 1897 \quad (7)$$

$$y \leq 2417e^{-3.3x} \quad (8)$$

$$y \geq 111.3 - 105.3x^{-0.7519} \quad (9)$$

and $$x > 1 \quad (10)$$

wherein x stands for the specific gravity (as measured at 20° C.) of sulfuric acid used for pasting, and y stands for the amount (ml) of said sulfuric acid used per 100 g of PbO, or within a secondary pasting region defined by the following empirical formula:

$$y \geq 1500e^{-2.77x} \quad (11)$$

wherein x and y are as defined above.

Figure 12:
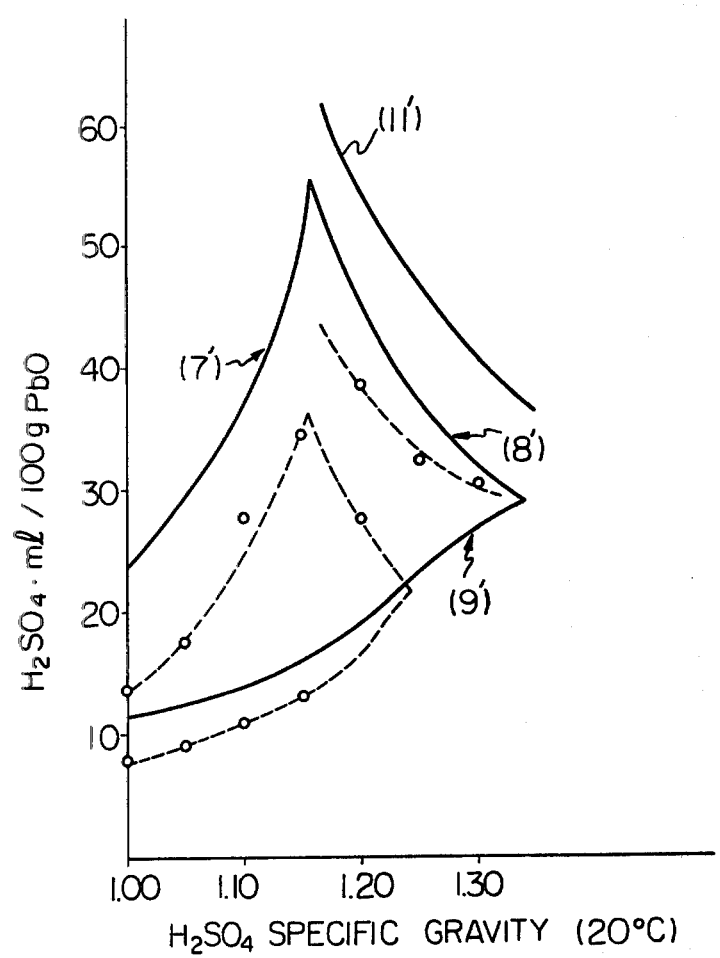
FIG. 12 is a curve showing the pasting region of the novel lead monoxide to be used in the present invention and the pasting region of the known lead monoxide.

FIG. 12 illustrates the pasting region of the present invention (the region surrounded by solid lines) and the pasting region attainable when known lead monoxide is used (the region surrounded by dot lines). In FIG. 12, solid lines 7', 8', 9' and 11' indicate boundaries where equal marks are established in the above formulae (7), (8), (9) and (11). From the experimental data shown in FIG. 12, it will readily be understood that according to the process of the present invention, since the novel ultrafine readilyreactive lead monoxide is used, the pasting region is remarkably broadened.

The amount used of sulfuric acid may be changed in a broad range, though the preferred amount differs depending on the type and kind of the plate. In general, however, it is preferred that sulfuric acid ($H_2SO_4$) be used in an amount of 0.2 to 30 mole %, especially 1 to 20 mole %, based on the lead monoxide or its heat treatment product. Optimum results are obtained when sulfuric acid is used in an amount of 6 to 15 mole %.

A paste is prepared by kneading the lead monoxide with dilute sulfuric acid under the above-mentioned conditions or by kneading an aqueous paste (or a hydrous cake) of the lead monoxide with dilute sulfuric acid having a relatively high specific gravity. When the latter method is adopted, water contained in the lead monoxide is calculated as water contained in sulfuric acid and the conditions are adjusted so that the above requirements are satisfied.

In the pasting operation, a known starting substance for an active material may be incorporated into the wet process ultrafine lead monoxide so far as the inherent characteristics thereof are not substantially damaged. For example, known lead powder (lead suboxide), yellow or red lead monoxide or minium may be incorporated in an amount of up to 50% by weight, especially up to 40 % by weight, based on the novel ultrafine lead monoxide.

In the pasting operation, known additives may be incorporated in known amounts. For example, at least one member selected from the group consisting of reinforcers such as glass fibers, rock wool, aromatic polyester fibers and polyamide fibers, powdery fillers such as silica, alumina and aluminum silicate, conductive reinforcers such as carbon black and graphite fibers, negative plate shrinkage-preventing agents such as barium sulfate, low-temperature rapid-discharge characteristic-improving agents such as lignin, and water-soluble or acid-soluble inorganic salts such as ammonium carbonate, sodium carbonate, sodium sulfate and ammonium sulfate may be incorporated in a small amount, for example, 0.01 to 1% by weight.

Kneading can be accomplished by using various powder kneading machines, for example, edge runner mills, pony mixers and Wagner mixers. In general, it is preferred that kneading be conducted for 2 to 60 minutes, especially 5 to 30 minutes.

The so formed paste is charged in spaces of a grid and then dried. The filling operation may be performed by using a known automatic charging machine and the charged paste can be dried according to various methods, for example, natural drying, heating drying and vapor drying. A cast product of a lead-antimony alloy having an antimony content of 3 to 8% by weight may be used as the grid. The amount charged of the paste is varied according to the intended use of the resulting lead battery, but it is preferred that the paste be charged in an amount of 2.5 to 5.0 $g/cm^3$, especially 3.0 to 4.5 $g/cm^3$, as calculated as PbO.

The plate thickness may be changed in a relatively broad range, but it is generally preferred that the thickness be such that the plate after the formation treatment has a thickness of 0.5 to 30 mm, especially 0.5 to 10 mm.

The paste is charged and dry positive and negative plates are alternately arranged in a tank, and an electric current is applied through dilute sulfuric acid to effect electrolytic oxidation and reduction and convert the paste to an active material, namely lead peroxide ($PbO_2$) and spongy metallic lead. This formation treatment may be either so-called tank formation conducted in a treating tank or so-called container formation conducted in a battery.

In general, it is preferred that the formation treatment be carried out at a current density of 0.2 to 1.5 $A/dm^2$, especially 0.5 to 1.0 $A/dm^2$ by using dilute sulfuric acid, especially one having a specific gravity of 1.05 to 1.15 as measured at 20° C. or a solution of ammonium sulfate or the like.

According to the present invention, by virtue of the feature that the ultrafine lead monoxide prepared according to the above-mentioned specific process is used as the starting substance of an active material, there can be attained a prominant advantage that the formation treatment can be accomplished with a much smaller quantity of electricity or electric power (integrated power) than in the case where known starting substances of active materials are employed. For example, as shown in Comparative Example given hereinafter, when known lead monoxide or lead suboxide (lead powder) is used as the starting substance of an active material, in order to convert a sulfuric acid paste of such known starting substance completely to an active material composed of lead dioxide, electricity in an amount 1.5 to 2.0 times the theoretical quantity is necessary. In contrast, when the above-mentioned novel lead monoxide is used according to the present invention, even the theoretical quantity of electricity is sufficient for complete conversion of the sulfuric acid paste to an active material composed of lead dioxide, and in general, in the present invention, the formation treatment can be conveniently accomplished with a quantity of electricity 1.1 to 1.6 times the theoretical quantity.

According to the present invention, the electric power necessary for the formation treatment can be remarkably reduced as compared with the electric power necessary in the conventional process, and further, the time required for the formation treatment can be remarkably shortened. Thus, there can be attained prominent advantages with respect to saving of labors and enhancement of productivity.

It is known that an active material of a positive plate obtained by the formation treatment includes two types, i.e., α-lead dioxide and β-lead dioxide, and that an active material having a higher β-lead dioxide shows a higher active material utilization ratio. A positive plate prepared from the wet process ultrafine lead monoxide according to the present invention has a higher content of β-lead dioxide than positive plates prepared according to known methods.

After completion of the formation treatment, a small quantity of an electric current may be applied in the reverse direction to effect so-called withdrawal discharge for coating the surface of the plate with a thin layer of lead sulfate. In case of the abovementioned container formation, the specific gravity of sulfuric acid is adjusted to 1.26 to 1.28 by exchange of the liquid or other means after the formation treatment. Thus, a charged lead battery is obtained.

As pointed out hereinbefore, assembling may be carried out before or after the formation treatment. As a material constituting a casing and lid of the battery, there may be employed polypropylene, a propylene-ethylene copolymer, an acrylonitrile-styrene resin, an acrylonitrile-styrene-butadiene resin and the like. As a separator, there may be employed, a plate, a ribbed wooden plate, a phenolic resin-impregnated paper, a rubber sheet having fine pores, a non-woven fabric composed of fibers of a synthetic resin such as polypropylene or polyester, a porous synthetic resin film and the like. Such separator can preferably be used in combination with a glass fiber mat.

At the assembling step, connection of respective cells may be accomplished according to the so-called COP (connection over the partition) system or CTP (connection through the partition) system.

Since the novel ultrafine lead monoxide is used as the starting substance of an active material, the lead battery of the present invention has a much higher active material utilization ratio than conventional lead batterys comprising active materials formed from the conventional lead monoxides.

In the instant specification, by the term "active material utilization ratio" is meant a value represented by the following formula:

$$RU = \frac{AH}{k \times W} \times 100 \qquad (12)$$

wherein W indicates the amount (g) of $PbO_2$ contained per positive plate, AH stands for the discharge capacity (Amp·hr) per positive plate, k is a constant having a value of 0.224 Amp·hr/gram, and RU stands for the active material utilization ratio (%).

As described in Example 1 and Comparative Example, when the comparison is made under the same preparation conditions and the same charging and discharging conditions, in case of a lead battery comprising an active material formed from known massicot type lead monoxide, the active material utilization ratio at either the initial discharge or the fifth discharge is below 36% and in case of a lead battery comprising an active material formed from known lead powder (lead suboxide), the active material utilization ratio at the fifth discharge is lower than 35% though the active material utilization ratio at the initial discharge is relatively high. In contrast, in case of a lead battery of the present invention comprising an active material formed from the novel ultrafine wet process lead monoxide, the active material utilization ratio is higher than 43%, especially higher than 50%, at either the initial discharge or the fifth discharge. The lead battery of the present invention is further characterized in that the utilization ratio retention (E) represented by the following formula:

$$E = RU_5/RU_1 \times 100 \qquad (13)$$

wherein $RU_1$ stands for the active material utilization ratio at the initial discharge and $RU_5$ stands for the active material utilization ratio at the fifth discharge, is at least 90%, especially 95%.

From the foregoing, it will readily be understood that according to the present invention, the discharge capacity can be increased over the discharge capacity of the known lead battery when the comparison is made based on the same weight and that the weight can be made smaller than that of the known lead battery when the comparison is made based on the same discharge capacity. Further, from the fact that the lead battery of the present invention has a high value of the utilization ratio retention, it will be apparent that the lead battery of the present invention is excellent in the durability and stability, i.e., the life.

The present invention can easily be applied to a so-called clad battery. Positive plates for a clad battery are prepared by capping a porous cylinder around a reed screen-like core (spine), charging the ultrafine wet process lead monoxide into a gap between the cylinder and the spine and subjecting the lead monoxide to the formation treatment. As the porous cylinder, there may be employed a pipe of a porous resin or rubber, a glass pipe, a porous fiber pipe and the like. These porous pipes may generally be arranged in a plurality of lines extending in the lateral direction.

The porous resin or rubber pipe may be formed of a polyolefin resin such as polyethylene, polypropylene or EPR, a halogen-containing polymer such as a vinyl chloride resin, a vinylidene chloride resin, a vinyl fluoride resin, a polytetrafluoroethylene, a tetrafluoroethylene/hexafluoropropylene rubber or a chloroprene rubber or an acid-resistant resin such as an acrylonitrile/styrene copolymer, an acrylonitrile/styrene/butadiene copolymer, NBR or SBR.

As the porous fiber pipe, there may be employed, for example, knitted or woven articles of a circular cylinder shape, an angular cylinder shape or a shape of such cylinders connected in the lateral direction, which are composed of inorganic fibers such as glass fibers, rock wool, slag wool or asbestos fibers, or synthetic fibers such as polyethylene fibers, polypropylene fibers, vinyl chloride resin fibers, vinylidene chloride resin fibers, acrylic fibers, polyester fibers, aromatic polyamide fibers or polytetrafluoroethylene fibers or articles having the above-mentioned shape, which are prepared from felts or non-woven fabrics composed of the foregoing fibers.

The inner diameter of such porous pipe is not particularly critical, but, in general, the inner diameter is adjusted to 5 to 50 mm, especially 10 to 20 mm.

The novel ultrafine wet process lead monoxide is packed in a gap between such porous pipe and spine in the powdery or wet state. Known means such as vibration, impaction, compression and ultrasonic vibration may be adopted for this packing operation. It is preferred that the pack density of the novel lead monoxide be 2.5 to 6.0 g/cm$^3$, especially 2.6 to 4.0 g/cm$^3$.

In preparing clad type plates, known additives may be incorporated in known amounts into the novel ultrafine wet process lead monoxide so as to improve various characteristics of the clad type plates.

In case of clad type plates, the formation treatment can be conducted in the same manner as described above with respect to paste type positive plates.

The present invention will now be described by reference to the following Examples that by no means limit the scope of the invention.

REFERENTIAL EXAMPLE 1

The process for the preparation of novel ultrafine lead monoxide and properties thereof are illustrated in this Example.

Metallic lead granules used for production of novel ultrafine lead monoxide were prepared according to the following method.

As the starting lead there was used so-called electrolytic lead having the following composition (weight ratio):

| | | |
|---|---|---|
| Ag | | 0.0001/1,000,000 |
| Cu | | 0.0001/100 |
| Zn | | 0.0001/100 |
| Fe | | 0.0001/100 |
| Ni | | — |
| Sn | | 0.0005/100 |
| Bi | | 0.0006/100 |
| As | | 0.0001/100 |
| Pb | above | 99.99/100 |

An ingot (about 50 Kg per piece) of this starting lead was charged in a vessel composed of cast iron and molten at about 350° to about 400° C. Separately, a diameter of 12 cm bowl-type iron vessel having 20 holes having a diameter of 1 to 2 mm perforated in the bottom thereof was attached to a vibrating machine so that electric vibrations were given to the iron vessel at a frequency of 100 Hz, and the iron vessel was set at a point 10 cm above the liquid level of a receiving tank filled with water maintained at about 40° to about 70° C. The molten metal was poured in the perforated iron vessel. Vibrations were given to metallic lead streams coming from the holes of the vessel and the streams were cut while falling toward the liquid level. When the molten lead was let to fall into water, it was divided into spheres having a diameter of about 1 to about 7 mm and solidified in water to form spherical granules of metallic lead.

Novel ultrafine lead monoxide was prepared directly from metallic lead granules according to the so-called wet pulverization method using a rotary mill.

The rotary mill used was a stainless steel tube mill having an inner diameter of 34.5 cm, a length of 130 cm and an inner volume of about 120 liters, and it was designed so that it could resist a pressure of 10 Kg/cm$^2$ gauge. A manhole of the square shape having a side of about 20 cm was formed at the center of this tube mill for cleaning of the inside of the mill and supply of raw materials, and a lid capable of resisting a pressure of 10 Kg/cm$^2$ gauge was attached to this manhole. A stainless steel pipe having an inner diameter of ½ inch was connected to one end plate of the tube mill through a rocky joint as a liquid medium introduction opening, so that the liquid medium was fed under pressure into the tube mill by a diaphragm pump of 1 horse power. Another stainless steel pipe having an inner diameter of ½ inch was connected to the other mirror plate of the tube mill through a rocky joint as a product slurry withdrawal opening. The top end of the withdrawal pipe was inserted in the tube mill so that it was positioned below the level of the liquid medium in the tube mill and the product slurry could be withdrawn from the inside of the tube mill by the action of the inside pressure. A stainless steel wire was disposed at in the tube mill at a point closer to the center of the tube mill than the position of the above top end of the withdrawal pipe so that the solids in the mill did not come into the pipe. Cooling water was showered onto the outside of the tube mill so that the entire of the tube mill was cooled. A motor of 5 horse powers was connected to the tube mill through gear wheels, and a non-stage transmission apparatus was disposed so that the rotation number of the tube mill could be changed within a range of 20 to 100 rpm.

A liwuid cyclone was attached to the discharge opening of the tube mill so as to prevent unreacted finer granules of metallic lead from being incorporated into the discharged dispersion.

The above tube mill having an inner capacity of 120 liters was charged with 200 Kg of metallic lead granules having a fresh surface through the manhole formed at the center of the tube mill. Pure water (deionized water) maintained at a temperature of 25°±3° C. was chosen as the liquid medium. Cooling water was showered on the outside of the tube mill so that a temperature of 25°±3° C. was maintained in the tube mill. In the first place, the tube mill was rotated at a rotation number of 50 rpm and 30 l of pure water maintained at the above temperature was charged into the tube mill, so that the solid-liquid ratio of the granular metallic lead and the liquid medium was about 6.6. Then, pure water maintained at the above temperature was poured into the tube mill at a rate of 1 l/min and the dispersion in an amount corresponding to the amount of the thus poured liquid medium was discharged from the tube mill. Simultaneously, oxygen ($O_2$) stored in an oxygen bomb was charged into the tube mill so that an inside pressure (gauge) of 20 Kg/cm$^2$ was maintained in the tube mill, and feeding of oxygen was continued that the inside pressure was maintained at the above level during the oxidation reaction. Thus, the oxidation reaction was carried out according to the wet pulverization method.

When the oxidation reaction became stationary (15 minutes after initiation of the reaction), the dispersion of the formed lead monoxide was recovered (sample S-1). After the reaction had been conducted for 60 minutes in the stationary state, the amount of the dispersion recovered during this period and the PbO concentration in the dispersion were determined, and the amount of the recovered lead monoxide was calculated from the determined values. Further, the amount (g/hr) formed of PbO, the oxygen absorption coefficient [ka, $g \cdot hr^{-1} \cdot l^{-1} \cdot (kg/cm^2)^{-1}$], the conversion (%) to PbO and the selectivity (%) to PbO were determined according to the methods described below.

(A) Amount (g/hr) Formed of Lead Monoxide

From results of the analytical measurement of the amount (ml) of the dispersion recovered by 60 minutes' oxidation reaction and the concentration (g/100 ml) of lead monoxide (PbO), the amount (g) formed of lead monoxide (PbO) was directly determined.

The quantitative analysis of lead monoxide was carried out according to the method of JIS K-1456.

(B) Oxygen Absorption Coefficient (ka) [$g \cdot hr^{-1} \cdot l^{-1} \cdot (kg/cm^2)^{-1}$]

The oxygen absorption coefficient was calculated according to the following formula (5) given hereinbefore:

$$Ka = Uo/(P \times V) \quad (5)$$

wherein Uo, P and K are as defined above.

(C) Conversion (%)

In order to know amounts of lead compounds formed from metallic lead by oxidation for a unit time (60 minutes), the conversion (%) of metallic lead was determined. More specifically, from the amount (Kg) of the granular metallic lead charged and the amount (Kg/hr) of the metallic lead (Pb) calculated and converted from the above-mentioned amount (g/hr) formed of PbO, the conversion (%) was calculated according to the following formula (14):

$$\text{Conversion (\%)} = \frac{\text{Amount of Pb Calculated from Amount Formed of PbO}}{\text{Amount of Charged Metallic Lead Granules}} \times 100 \quad (14)$$

(D) Selectivity (%) to Lead Monoxide (PbO)

In order to compare the amount formed of lead monoxide with amounts formed of other lead compounds capable of being formed by the above reaction, such as minium ($Pb_3O_4$), lead carbonate ($PbCO_3$) and white lead [$2PbCO_3 \cdot Pb(OH)_2$], the selectivity to lead monoxide was determined. All the lead compounds contained in the recovered lead oxide dispersion were dissolved in a nitric acid-hydrogen peroxide solution, and amounts (as calculated as Pb) of minium and white lead were determined according to the method of JIS K-1457 [determination of minium ($Pb_3O_4$)] and the method of JIS K-5103 (determination of white lead) and these determined amounts were reduced from the total amounts of lead compounds in the recovered dispersion to determine the amount (as calculated as PbO) of lead monoxide. Then, the selectivity (%) to lead monoxide was calculated according to the following formula (15):

$$\text{Selectivity (\%) to Lead Monoxide} = \frac{\text{Amount of Lead Monoxide as PbO}}{\text{Amount of Total Lead Components as PbO}} \times 100 \quad (15)$$

It was found that under the above-mentioned oxidation conditions, the amount formed of PbO was 2650 g/hr, the ka value was 0.53, the conversion to PbO was 1.23% and the selectivity to PbO was 99.7%.

The so recovered dispersion was subjected to solid-liquid separation by using, if necessary, a centrifugal separator, and a lead monoxide cake was recovered or it was dried according to need. With respect to the so recovered cake or dried cake, the true density (ds, g/cc), the primary particle size ($\mu$), the acetic acid-insoluble component content (%), the hue, the X-ray diffraction pattern, the infrared absorption pattern and the chromic anhydride reactivity (RC, %) were determined according to the methods described below.

(E) True Density (gram/cc)

A picnometer was filled with benzene and the weight (W) of benzene was measured. The temperature (Ti) was also measured by a thermometer equipped to the picnometer. Then, benzene was withdrawn from the picnometer, and a prescribed amount (M, g) of a sample was charged into the picnometer and benzene was added. The picnometer was placed in a reduced pressure desiccator, and a reduced pressure of 3 mm Hg was maintained for 3 hours by using a vacuum pump. Then, the cock was closed and the vacuum pump was dismounted. Then, the picnometer was allowed to stand still at the temperature (Ti) overnight. The cock was opened and the picnometer was taken out. Benzene was added to full the picnometer. The weight (W') and the temperature (Ti) were measured, and the true density (ds) was calculated according to the following formula:

$$ds = \frac{M}{\frac{(M + W) - W'}{d}} \quad (16)$$

wherein ds denotes the true density of the sample and d denotes the specific gravity of benzene at the temperature Ti.

A product obtained by drying the dispersion at about 20° to about 25° C. under reduced pressure was used as a sample in this test.

(F) Average Particle Size ($\mu$)

In the instant specification, by the term "average particle size" is meant the size of particles directly measured by using an electron microscope when the respective particles are well dispersed.

As in the case of the measurement of the true density (E), a dried product obtained by drying the dispersion under a reduced pressure was used as a sample. An appropriate amount of the finely divided sample was placed on a glass sheet, and paraffin or vaseline in a volume substantially equal to the volume of the sample was added to the sample. The mixture was sufficiently kneaded with a stainless steel spatula and a small amount of ethanol was added to the kneaded mixture. The mixture was further kneaded on the glass sheet sufficiently. The kneaded mixture was placed on a mesh net for the electron-microscopic measurement and dipped in ethanol to dissolve out paraffin or vaseline. Then, the specimen was dried for 1 hour in a drier maintained at 60° to 70° C. to remove ethanol by evaporation.

According to customary procedures, four photographs having a magnification of 10,000 to 20,000 suitable for determination of the average particle size and differing in the field of vision were obtained under conditions of an electron microscope magnification of 1000 to 2000 and a photograph enlargement ratio of 10.

Six typical particles were chosen from cubic particle images on one field of vision, and the length of one size of each particle image, regarded as being parallel to the vision field face (mesh face), was measured by using a scale. The maximum value among the thus measured values was defined as the primary particle size referred to in the instant specification.

(G) Content of Acetic Acid-Insoluble Component (%)

According to the method of JIS K-1456 (determination of litharge), the amount of the acetic acid-insoluble component, namely metallic lead, was determined, and expressed in %.

(H) Hue

The hue was evaluated with the naked eye observation.

(I) Measurement of X-Ray Diffraction Pattern

The X-ray diffraction pattern was measured under the following conditions according to the powder method using an automatic recording X-ray diffraction apparatus (manufactured by Rigaku Denki; X-ray generator=Cat No. 2171 (L); goniometer=Cat No. 4001):
target: Cu (K$\alpha$)
filter: Ni
voltage: 30 KV
current: 15 mA
count full scale: 500 C/S
high pressure voltage: 1200 V
time constant: 2 sec
chart speed: 2 cm/min
scanning speed: 2°/min
diffraction angle: 1°
slit width: 0.3 mm Typical crystal forms of lead monoxide were classified as follows:
L: litharge type
M: massicot type
H: hydrate type (J) Measurement of Infrared Absorption Spectrum The infrared absorption spectrum was automatically recorded in a wave length region of 5000 to 200 cm$^{-1}$ by using an infrared absorption spectrum measuring apparatus (Model 295 manufactured by Hitachi Seisakusho) with respect to KBr tablets molded in vacuo (3 mm Hg) under a compression of 500 Kg/cm$^2$. The intensity of the absorption peak was evaluated according to the following scale:
vs: very strong
s: strong
m: mean
w: weak
b: broad
sh: shoulder (K) Chromic Anhydride Reactivity (%)

A 2-liter beaker was charged with 500 ml of water, and 69.06 g, as solid component precisely weighed, of the lead monoxide dispersion was put into water under mild agitation and sufficiently dispersed in water. Then, the temperature of the dispersion was elevated to 65° C. Then, 100 ml of an aqueous solution of chromic anhydride (30.94 g/100 ml of water) was gradually added to the dispersion over a period of 30 minutes, and the mixture was aged at 65° C. for 60 minutes under agitation to thereby form crystals of lead chromate. The crystals of lead chromate were recovered by filtration through a filter paper No. 3, washed with water and dried at 110° C. The amount (g) of chromic anhydride (CrO$_3$) thus fixed as lead chromate was determined by the quantitative analysis. From the thus determined amount (g) of chromic anhydride fixed as lead chromate and the amount (g) of chromic anhydride used, the chromic anhydride reactivity (RC %) was calculated according to the following formula:

$$RC\ (\%) = \frac{\text{Amount (g) of CrO}_3 \text{ fixed as lead chromate}}{\text{Amount (g) of CrO}_3 \text{ used}} \times 100 \quad (6)$$

(L) Bulk Specific Gravity (g/cc)

AS in the case of (E), a product obtained by drying the dispersion under a reduced pressure was used as a sample. The sample was charged in a graduated tube equipped to a specific volume measuring tube (manufactured by Ishiyama Kagaku). The weight of the sample had been weighed precisely to an order of 1.0 mg. Falling shocks were imparted to the graduated tube at a frequency of two times per minute over a period of 20 minutes. The volume of the sample in the tube was read to the order of 0.1 cc, and the bulk specific gravity BD (cc/g) was calculated according to the following formula:

$$BD(\text{cc/g}) = \frac{\text{volume (cc) after impartion of falling shocks}}{\text{weight (g) of sample}} \quad (17)$$

The properties of the lead monoxide prepared in Referential Example 1 were measured according to the above-mentioned methods to obtain results shown in Table 4.

Table 4

| | |
|---|---|
| True Density | 8.39 (g/cc) |
| Average Particle Size | 0.08 ($\mu$) |
| Acetic Acid-Insoluble Component Content | 0 (%) |
| Hue (dried product) | orange |
| X-Ray Diffraction Crystal Form | L |
| Infrared Absorption | VS |
| Chromic Acid Reactivity | 99.9 (%) |
| Bulk Specific Gravity | 2.5 (g/cc) |

REFERENTIAL EXAMPLE 2

Novel ultrafine lead monoxides were prepared under various conditions, and their properties were examined.

Metallic lead granules having a size of about 1 to about 7 mm, which were prepared according to the method described in Referential Example 1, were used as the starting lead. The wet pulverization type stainless tube mill of an inner capacity of about 120 l, described in Referential Example 1, was used as the lead monoxide-preparing apparatus.

Lead monoxides were prepared in the same manner as described in Referential Example 1 except that four reaction conditions indicated in Table 5 were adopted. In each run, the formed lead monoxide was recovered in the form of the lead monoxide dispersion, and in the same manner as described in Referential Example 1, the amount (g/hr) formed of PbO, the oxygen absorption constant, the conversion (%) to PbO, and the selectivity (%) to PbO were determined.

The resulting dispersions were subjected to the solid-liquid separation and dried, according to need. With respect to the recovered lead monoxide cakes or dried products thereof, the properties were determined according to the methods described in Referential Example 1. Obtained results are shown in Table 5.

Table 5

| | Sample No. | | | |
|---|---|---|---|---|
| | S-2 | S-3 | S-4 | S-5 |
| Preparation Conditions | | | | |
| amount (l) of liquid medium | 30 | 30 | 20 | 30 |
| amount (Kg) of metallic lead granules | 200 | 200 | 200 | 200 |
| tube mill rotation number (r.p.m.) | 50 | 50 | 50 | 50 |
| reaction temperature (°C.) | 5 | 5 | 25 | 5 |
| reaction time (min.) | 30 | 30 | 30 | 30 |
| oxidation gas | $O_2$ | $O_2$ | $O_2$ | $O_2$ |
| oxidation gas pressure ($Kg/cm^2G$) | 2 | 2 | 2 | 2 |
| catalyst | not | acetic acid | not | not |
| catalyst concentration (g/100 cc) | — | 0.2 | — | — |
| Manufacture Data | | | | |
| hue of recovered dispersion | lemon | white | orange | yellow |
| amount formed (g/hr) of PbO | 2900 | 3580 | 2400 | 2650 |
| oxygen absorption coefficient Ka | 0.58 | 0.71 | 0.48 | 0.53 |
| conversion (%) | 1.35 | 1.66 | 1.11 | 1.23 |
| selectivity (%) | 99.7 | 99.1 | 99.8 | 99.8 |
| Properties of Lead Monoxide | | | | |
| true density (g/cc) | 8.39 | 8.82 | 9.11 | 8.90 |
| primary particle size ($\mu$) | 0.05 | 0.07 | 0.03 | 0.05 |
| acetic acid-insoluble component content (%) | 0 | 0 | 0 | 0 |
| hue (dried product) | yellow | white | orange | yellow |
| X-ray diffraction crystal form | L | M. H | M | L. M |
| infrared absorption spectrum | VS | VS | VS | VS |
| chromic anhydride reactivity (%) | 99.9 | 99.9 | 99.0 | 99.5 |
| bulk specific gravity (g/cc) | 2.5 | 2.7 | 2.5 | 2.5 |

REFERENTIAL EXAMPLE 3

Preparation of plate grids used in Examples of the present invention is illustrated in this Referential Example.

Electrolytic lead described in Referential Example 1 was used as the starting metallic lead for plate grids.

An ingot (about 50 Kg) of the electrolytic lead was put into a vessel composed of cast iron, and the temperature was maintained at about 350° C. to melt the ingot.

The molten metallic lead was pressed into a molding frame (having a size of 103 mm×72 mm×2 mm and including 60 grid sections (5×12), each section has a size of 10 mm×5 mm×2 mm). Thus, there were prepared plate grids composed of metallic lead, each having a weight of about 100 g.

REFERENTIAL EXAMPLE 4

In order to clarify the effects of the present invention, known lead oxides that have heretofore been used as starting substances of active materials of lead batterys, are illustrated in this Example.

The following lead suboxide, massicot type litharge, commercially available litharge, red ultra-pure lead monoxide and yellow ultra-pure lead monoxide were chosen as the known lead monoxides.

(a) Lead Suboxide

Powdery lead suboxide having a composition and properties shown in Table 6 and prepared according to the Shimazu lead powder method (Kikai Gakkai-Shi, 28, pages 489–516, 1925) (manufactured and sold by Mizusawa Kagaku Kogyo) (hereinafter referred to as "Sample H-1").

(b) Massicot Type Litharge

According to the method disclosed in Japanese Patent Publication No. 11801/62, the powdery lead suboxide (a) mentioned above was calcined at 600° to 650° C. and then pulverized to form massicot type litharge powder (sample H-2) (manufactured and sold by Mizusawa Kagaku Kogyo) having a composition and properties shown in Table 6. This powdery massicot type was chosen as the conventional massicot type litharge.

(c) Commercially Available Litharge

Commercially available powdery litharge (manufactured and sold by Kosoo Kagaku) (sample H-3), which has a composition properties shown in Table 6, was chosen as the commercially available litharge.

(d) Ultra-Pure Yellow and Red Lead Monoxides

As another known lead monoxides, there were chosen ultra-fine powdery lead monoxides prepared according to the method disclosed in W. Kwestroo and A. Huizing, J. Inorg. Nucl. Chem., 27, pages 1951–1954, 1965.

More specifically, 165 g of lead acetate [Pb(CH$_3$COO)$_2$.3H$_2$O] was charged in a 2-liter capacity polyethylene vessel, and 350 ml of pure water was added to form a solution. The solution was passed at a rate of 75 ml/min through a polyethylene column having an inner diameter of 3 cm and a length of 10 cm and packed with metallic lead granules (having a particle size of 10 to 100$\mu$), and the resulting lead acetate solution from which such impurity elements as Si, Fe, Al, B, As, Mn and the like had been removed was placed in a polyethylene vessel. Then, 1650 ml of 10-N aqueous ammonia which had been carefully prepared so that such impurity elements as Si, Mg, Fe, Al, B As, Mn and the like were not incorporated at all was poured into the above lead acetate solution at 25° C. under agitation by using a magnetic stirrer, to thereby form a bulky white precipitate. This precipitate was, however, converted in several minutes to a greenish crystalline precipitate. The precipitate was washed 5 times by decantation using purified 2 N aqueous ammonia. Then, 200 ml of pure water was added to the precipitate and the mixture was maintained at 80° C. for 10 hours, whereby the greenish crystalline precipitate was converted to a greenish dark scarlet precipitate. The precipitate was washed 5 times purified 2 N aqueous ammonia and dried at 95° C. for 6 hours on a platinum saucer to obtain crystals of lead monoxide having a sharp scarlet color.

The crystals were further dried at 150° C. for 6 hours to obtain a ultra-pure lead monoxide powder having a scarlet color (sample H-4).

The above procedures were repeated in the same manner as described above except that glass vessels were used instead of polyethylene vessels. In this case, a ultra-pure lead monoxide powder having a sharp yellow color (sample H-5) was obtained.

Compositions and properties of the so prepared scarlet and yellow lead monoxides (samples H-4 and H-5) are shown in Table 6.

Table 6

|  | Sample No. | | | | |
| --- | --- | --- | --- | --- | --- |
|  | H-1 | H-2 | H-3 | H-4 | H-5 |
| True Density (g/cc) | 9.95 | 9.36 | 9.37 | 9.36 | 9.57 |
| Average Particle Size ($\mu$) | 0.9–2 | 4–8 | 2–8 | 3–5 | 3–5 |
| Acetic Acid-Insoluble Component Content (%) | 30.4 | 5.3 | 0.8 | 0 | 0 |
| Hue (dry product) | dark greyish green | orange | yellow | scarlet | yellow |
| X-Ray Diffraction Crystal Form | — | M | M | L | M |
| Infrared Absorption | — | wb | wb | — | wb |
| Chromic Anhydride Reactivity (%) | 56.5 | 79.4 | 74.8 | 43.5 | 93.5 |
| Bulk Specific Gravity (g/cc) | 2.86 | 3.94 | 4.46 | 4.58 | 4.62 |

EXAMPLE 1

(I) Preparation of Single Battery (1) A porcelain mortar was charged with 40 g of a lead oxide, 0.08 g of glass wool cut into a length of 3 to 5 mm as an aggregate and 4 ml of water, and the mixture was kneaded to form a paste comprising the lead oxide as the starting substance of an active material and having a hardness suitable for kneading and charging into grits. A predetermined amount (ml) of sulfuric acid having a predetermined specific gravity was added to the paste to form a starting substance paste having a predetermined amount of sulfuric acid. In this Example, unless otherwise indicated, 3.91 ml of sulfuric acid having a specific gravity $D_{20}$ of 1.250 was added to 40 g of the lead oxide, and sulfuric acid was contained in an amount of 10% by weight as lead sulfate. These were standard mixing conditions.

(2) Then, the starting substance paste (40 g as measured as the dry solid) prepared according to the above method was charged within about 5 minutes into the metallic lead grid prepared in Referential Example 3 by means of a steel spatula. Then, the charged grid was inserted between two rubber sheets having a thickness of 10 mm and the paste was pressed for 3 minutes under a pressure of 25 Kg/cm² by a hydraulic press and dried for 5 hours in a drier maintained at 100° C. to form starting substance-charged plates.

(3) The starting substance-charged and dried plates were placed into a hard transparent vinyl chloride resin vessel (15 cm × 10 cm × 5 cm) (hereinafter referred to as "casing") charged with 600 ml of sulfuric acid having a specific gravity $D_{20}$ of 1.100, and two lead plates (having a size of 75 mm × 110 mm × 3 mm) were disposed on both the sides of the assembly of the starting substance-charged plates. In a thermostat water tank maintained at 25°±2° C., the formation treatment was carried out at a current density of 5 mA/dm² by applying an electricity in a quantity corresponding to 200 to 250% of the theoretical quantity for about 22 hours to prepare formed paste type plates.

(4) After the formation treatment, the plates were taken out and washed sufficiently in running water to remove sulfate ions, and they were dried at 100° C. for 5 hours.

(5) The conditions of the initial charging for formation of a single battery were as follows:

The above-mentioned transparent vinyl chloride resin casing was charged with 600 ml of sulfuric acid having a specific gravity $D_{20}$ of 1.280±0.005, and one formed positive plate was placed in the center of the cell. Two negative plates prepared and formed in the same manner as the positive plate were set on both the sides of the positive plate, each negative plate being distant by 10 mm from the positive plate to form a single battery. Then, the single battery casing was put into a thermostat water tank maintained at 25°±2° C. and charging was conducted for about 65 hours at a constant current of 0.35 A by using a constant current device Model GPO25-5 manufactured by Takasago Seisakusho to prepare a paste plate single electrode which had been initially charged.

(II) Method for Determination of Formation Ratio

The formation ratio was determined according to the following method so as to know the advance of the formation treatment.

A plate charged with an active material under certain conditions was placed under certain formation conditions (in sulfuric acid having a specific gravity $D_{20}$ of 1.100 in a thermostat water tank maintained at 25°±2° C. at a current density of 5 mA/dm²), and an electricity in a quantity corresponding to 100%, 150% or 200% of the theoretical quantity was applied to the plate under the above conditions (in each Example, the data of the formation ratio were those obtained when the electricity was applied in a quantity corresponding to 100% of the theoretical quantity). The plate was washed in running pure water and then dried. A certain amount of the active material prepared by the formation treatment was collected from the dried plate and the $PbO_2$ content was determined according to the ordinary chemical analysis. The formation ratio F (%) was calculated according to the following formula:

$$F (\%) = (W/S) \times 100 \tag{18}$$

wherein W stands for the content (g) of $PbO_2$ in the sample, determined by the chemical analysis, S stands of the amount (g) of the sample collected, and F stands for the formation ratio in the active material.

Incidentally, $F_{100}$ means the formation ratio obtained when an electricity was applied in a quantity corresponding to 100% of the theoretical quantity.

(III) Discharge Test Method

Discharging was conducted in the so prepared single battery under conditions described below, and the time required for the voltage to be lowered to the discharging ending voltage (1.75 V) was measured. The product of this time and the discharge current (0.6 A) was calculated. After completion of charging, the single battery was allowed to stand in the open state for 1 hour, and this point was set as the discharging-initiating point. During the discharging, the temperature of the electrolyte was automatically adjusted to 25°±2° C. and the discharging current (time rated current) was adjusted to 0.60 A. Further, the discharging ending voltage was set as 1.75 V. As the discharger was used a discharger Model PLZ 50-15 manufactured by Kikusui Denshi Kogyo, and the adjustment of the temperature of the electrolyte was performed by a thermostat water tank Model BKP-42 manufactured by Yamato Kagaku.

Just after the discharging, the single battery was charged again for a charging time of 16 to 17 hours with a charging current of 0.35 A until the specific gravity of the electrolyte was maintained at a constant level after the temperature calculation. Namely, charging was conducted until the specific gravity of the electrolyte of the single battery was 1.28±0.005 as calculated at 20° C. at the point of termination of charging. During charging, the temperature of the electrolyte was automatically adjusted to 25°±2° C.

The above-mentioned charging-discharging cycle was repeated 5 times. From average discharge capacity (AH) in these 5 cycles of the actual discharging and the theoretical electric capacity calculated the $PbO_2$ content in the positive plate, the positive plate utilization ratio RU (%) was calculated according to the following formula (12) given hereinbefore:

$$RU (\%) = \frac{AH}{k \cdot W} \times 100 \qquad (12)$$

Five lead monoxides prepared according to the methods described in Referential Examples 1 and 2 were dried at 110° C. for 5 hours, and the dried products were used as starting substances for active materials and paste type plates were prepared according to the above-mentioned method. Then, single batterys were including these positive plates were prepared.

With respect to each of the so prepared single batterys, the formation ratio ($F_{100}$) and utilization ratio (RU) were determined to obtain results shown in Table 7.

COMPARATIVE EXAMPLE

Conventional lead oxides heretofore used as starting substances, described in Referential Example 4, namely lead suboxide, massicot type litharge, commercially available litharge, red and yellow ultra-pure lead monoxides, were dried at 110° C. for 5 hours. By using the dried products as the starting substances for active materials, paste type plates were prepared according to the method described in Example 1, and comparative single batterys including these plates were prepared.

With respect to each of the so prepared single batterys, the formation ratio ($F_{100}$) and the utilization ratio (RU) were determined to obtain results shown in Table 7.

From the results shown in Table 7, it will readily be understood when ultrafine lead monoxide is used as the starting substance of an active material of a lead battery and a paste type plate is prepared from this starting substance, a high formation ratio can be attained as compared with conventional lead suboxide, litharge or other lead oxides, and even with an electricity quantity corresponding to 100% of the theoretical quantity, the formation ratio is as high as 70 or 80%. Accordingly, in the present invention, the formation treatment of the plate can be completed with a much reduced quantity of electricity, and a high utilization, i.e., a large electric capacity, can be attained.

Table 7

| Sample No. of Starting Substance of Active Material | Formation Ratio ($F_{100}$) (%) | Active Material Utilization Ratio (RU) (%) |
|---|---|---|
| Samples of Present Invention | | |
| S-1 | 85.3 | 46.4 |
| S-2 | 86.2 | 47.5 |
| S-3 | 72.0 | 44.4 |
| S-4 | 84.6 | 46.5 |
| S-5 | 88.0 | 48.0 |
| Comparative Samples | | |
| H-1 | 42.2 | 40.9 |
| H-2 | 38.7 | 34.5 |
| H-3 | 37.6 | 38.5 |
| H-4 | 34.0 | 30.2 |
| H-5 | 33.3 | 24.8 |

EXAMPLE 2

Single batterys prepared by using as a starting substance of an active material novel ultra-fine lead monoxide heat-treated at various temperatures are illustrated in this Example.

Lead monoxide (sample S-1) prepared in Referential Example 1 was chosen as the novel ultrafine lead monoxide. The sample was heated at 200°, 400°, 500° or 700° C. for 1 hour (sample T-1, T-2, T-3 or T-4). By using these heat-treated products, paste type plates and single batterys were prepared according to the methods described in Example 1, and with respect to each of these single batterys, the formation ratio ($F_{100}$) and the utilization ratio (RU) were determined to obtain results shown in Table 8.

EXAMPLE 3

In this Example, single batterys were prepared by using novel ultrafine lead monoxide as a starting substance of an active material while changing the amount of sulfuric acid used for formation of pastes.

Lead monoxide (sample S-1) prepared according to the method described in Referential Example 1 was chosen as the novel ultrafine lead monoxide, and to 40 g of the sample was added sulfuric acid having a specific gravity $D_{20}$ of 1.250 in such an amount that lead sulfate was contained in the active material in an amount of 4, 8, 12 or 16% by weight and a paste was prepared in the same manner as described in Example 1. A plate was prepared from this paste, and single batterys including such plate (samples 3-1, 3-2, 3-3 and 3-4) were prepared. With respect to each of these batterys, the formation ratio ($F_{100}$) and the utilization ratio (RU) were determined to obtain results shown in Table 8.

EXAMPLE 4

In this Example, single batterys prepared by using as a starting substance of an active material novel ultrafine lead monoxide while changing the secondary particle size and its distribution range are illustrated.

The lead monoxide dispersion (S-1) prepared according to the method described in Referential Example 1 was chosen as the novel ultrafine lead monoxide. The secondary particle size and its distribution range were changed according to the following methods.

(1) The lead monoxide dispersion was sprayed in hot air maintained at about 300° C. according to the spray-drying method and simultaneously, the sprayed dispersion was granulated into particles having a size of about 0.05 to 2 mm. Then, the so granulated lead monoxide was classified into three fractions by using a Tyler 14- mesh stainless steel sieve (mesh size=1.168 mm) and a Tyler 150-mesh stainless steel sieve (mesh size=0.104 mm). Namely, a fraction not passable through 14 mesh (sample 4-1), a fraction having a size between 14 mesh and 150 mesh (sample 4-2) and a fraction passable through 150 mesh (sample 4-3) were collected.

(2) The above sample 4-2 was pulverized by an atomizer and the pulverized product was classified into three fractions by using a Tyler 100-mesh stainless steel sieve (mesh size=0.147 mm), a Tyler 200-mesh stainless steel sieve (mesh size=0.074) and a Tyler 325-mesh stainless steel sieve (mesh size=0.043 mm). Namely, a fraction having a size of 100 to 200 mesh (sample 4-4), a fraction having a size of 200 to 325 mesh (sample 4-5) and a fraction passable through 325 mesh (sample 4-6) were collected.

(3) The above samples 4-2 and 4-5 were mixed at a weight ratio of 1:1 to form a mixture of lead oxides differing in the particle size (sample 4-7).

By using the so prepared lead monoxides differing in the secondary particle size, plates were prepared in the same manner as described in Example 1, and single batterys including these paste type plates were prepared. With respect to each of these single batterys, the formation ratio and utilization ratio were determined to obtain results shown in Table 8.

Table 8

| Sample No. of Starting Substance of Active Material | Formation Ratio ($F_{100}$) (%) | Active Material Utilization Ratio (RU) (%) |
|---|---|---|
| Example 2 | | |
| T-1 | 82.6 | 47.8 |
| T-2 | 68.4 | 47.1 |
| T-3 | 62.7 | 41.7 |
| T-4 | 59.6 | 45.1 |
| Example 3 | | |
| 3-1 | 48.7 | 27.6 |
| 3-2 | 84.4 | 45.8 |
| 3-3 | 78.3 | 42.5 |
| 3-4 | 55.5 | 35.9 |
| Example 4 | | |
| 4-1 | 87.4 | 50.0 |
| 4-2 | 82.5 | 48.0 |
| 4-3 | 85.5 | 42.1 |
| 4-4 | 85.5 | 45.2 |
| 4-5 | 85.8 | 46.8 |
| 4-6 | 86.5 | 49.8 |
| 4-7 | 86.0 | 50.2 |

From the results shown in Table 8, the following can be seen.

Products obtained by heat-treating the novel ultrafine lead monoxide at various temperatures as in Example 2 show similarly good formation ratio and utilization ratio. However, in the products heat-treated at temperatures causing formation of minium, the utilization ratio is relatively low.

At the pasting step, when the sulfuric acid concentration is close to the critical concentration of the pasting region, the utilization ratio tends to decrease.

In connection with the secondary particle size distribution, a product including particles having a larger particle size and particles having a smaller particle size at an appropriate mixing ratio shows a higher utilization ratio than a product including particles having a large size alone or particles having a small size alone.

EXAMPLE 5

In this Example, a clad type plate single battery was prepared by using novel ultrafine lead monoxide as the starting substance of an active material

I. Preparation of Single Battery Having Clad Type Plates (1) In a porcelain mortar, 80 g of a lead oxide indicated below was mixed with 0.16 g of glass wool having a size cut into 3 to 5 mm as an aggregate and 20 ml of water, to prepare a mixture having a hardness suitable for charging into a clad type plate rod. Then, 5.56 ml of sulfuric acid having a specific gravity $D_{20}$ of 1.280 was added to and sufficiently kneaded with the above mixture to form an active material-forming mixture containing 10% by weight of lead sulfate. Separately, 4 connected lead positive plate spines having a diameter of about 3 mm and a length of 120 mm were inserted in 4 bottomed cylinders having an inner diameter of 8 mm and a length of 90 cm and composed of an acid-resistant filter cloth (Tetron FLT 40 manufactured by Kyowa Filter; thickness=about 1.2 mm). The above active material-forming mixture was charged in each cylinder having the spine located at the center thereof and was packed as firmly as possible by using a stainless steel spatula and a vibrator. Then, the packed mixture was dried for 5 hours in a drier maintained at 110° C. to form a clad type plate. The amount packed of the mixture was shown in Table 9.

(2) The so prepared packed clad type plates were used as positive plates, and in the same manner as described in Example 1, two lead negative plates were placed on both the sides in a hard transparent vinyl chloride resin casing. Electricity was applied at a current density of 14 mA/dm$^2$ for about 22 hours in a thermostat water tank maintained at 25°±2° C. with an electricity quantity corresponding to 200 to 250% of the theoretical quantity to effect the formation treatment and form clad type plates.

(3) After the formation treatment, the clad type plates were taken out, washed sufficiently in running water to remove sulfate ions and dried again at 100° C. for 5 hours.

(4) In the above-mentioned hard transparent vinyl chloride resin casing was charged 600 ml of sulfuric acid having a specific gravity $D_{20}$ of 1.280±0.005, and a positive plate having 4 clad type positive rods connected and aligned in parallel was placed in the central portion of the casing. Thus, a single battery having this positive plate and two negative plates located on both the sides of the positive plate in parallel thereto with a distance of 10 mm was thus assembled.

Then, the single battery casing was put into a thermostat water tank maintained at 25°±2° C. and charging was conducted for about 65 hours with a constant current of 1 A to complete the initial charging in the single battery. II. The discharging test and formation tests were carried out according to the same methods as described in Example 1.

As the starting lead monoxide was chosen the novel ultrafine lead monoxide (sample S-1) prepared according to the method described in Referential Example 1.

In order to clarify the effects of the present invention, clay type plate single batterys were prepared in the same manner as described above by using samples H-1 and H-2 described in Referential Example 4 as conventional lead powder and massicot type litharge used for preparation of active materials, and the formation ratio and utilization ratio were determined and compared with the results of the above battery.

Obtained results are shown in Table 9.

Table 9

| Sample No. of Starting Substance of Active Material | Formation Ratio ($F_{100}$) (%) | Active Material Utilization Ratio (RU) (%) | Pack Density (g/cc) to Plate Core |
|---|---|---|---|
| Sample of Present Invention | S-1 | 68.7 | 48.5 | 3.79 |
| Comparative Substances | H-1 | 32.6 | 39.8 | 2.89 |
| | H-2 | 24.0 | 25.5 | 4.14 |

From the above results, it will readily be understood that also when a clad type positive plate is prepared by using novel ultrafine lead monoxide according to the present invention, much higher formation and utilization ratios can be attained than in the case where conventional lead powder and litharge are used.

What we claim is:

1. A process for the preparation of an electrode for lead batteries comprising packing a paste of lead monoxide and sulfuric acid into a grid and subjecting the paste to the formation treatment to convert the paste to an active material and form a plate, said lead monoxide being a lead monoxide having a true density of 8.3 to 9.2 g/cc, an average particle size not larger than 0.2μ, an infrared absorption peak at a wave number of 1400 to 1410 cm$^{-1}$ and a chromic anhydride reactivity of at least 94% or a heat treatment product thereof.

2. A process according to claim 1 wherein said lead monoxide or heat treatment product has such a particle size distribution that particles having a size of 0.3 to 100μ occupy at least 25% by weight of total particles.

3. A process according to claim 1 wherein said lead monoxide or heat treatment product and sulfuric acid are formed within a secondary pasting region defined by the following empirical formulae:

$$y \leq 1820x^2 - 3694x + 1897$$

$$y \leq 2417e^{-3.3x}$$

$$y \geq 111.3 - 105.3x^{-0.7519}$$

and $$x > 1$$

wherein x stands for the specific gravity (as measured at 20° C.) of sulfuric acid used for pasting, and y stands for the amount (ml) of said sulfuric acid used per 100 g of PbO, or within a secondary pasting region defined by the following empirical formula:

$$y \geq 1500e^{-2.77x}$$

wherein x and y are as defined above.

4. A process according to claim 1 wherein sulfuric acid is added in an amount of 0.2 to 30 mole % based on said lead monoxide or heat treatment product, and the mixture is kneaded to form a paste.

5. A process according to claim 1 wherein the paste is packed in the grid in an amount of 2.5 to 5.0 g/cm$^3$ as the dry solid.

6. A process according to claim 1 wherein the paste packed in the grid is subjected to the formation treatment is sulfuric acid having a specific gravity of 1.050 to 1.150 as measured at 20° C. under application of electricity at a current density of 0.2 to 1.5 A/dm$^2$.

7. A process according to claim 1 wherein said heat treatment product is a product obtained by heat-treating said lead monoxide at a temperature of 30° to 450° C. or 500° to 850° C.

8. A process for the preparation of an electrode for clad type lead batteries comprising packing lead monoxide into a gap between a spine and a porous cylindrical member and subjecting the lead monoxide to the formation treatment to convert it to an active material and form a positive plate, said lead monoxide being a lead monoxide having a true density of 8.3 to 92 g/cc, an average particle size not larger than 0.2μ, an infrared absorption peak at a wave number of 1400 to 1410 cm$^{-1}$ and a chromic anhydride reactivity of at least 94% or a heat treatment product thereof.

9. A process according to claim 8 wherein said lead monoxide or heat treatment product is packed in a pack density of 2.5 to 6.0 g/cm$^2$ as the dry solid.

10. A process according to claim 8 wherein said lead monoxide or heat treatment product is subjected to the formation treatment is sulfuric acid having a specific gravity of 1.050 to 1.150 as measured at 20° C. under application of electricity at a current density of 0.2 to 1.5 A/dm$^2$.

* * * * *

UNITED STATES PATENT AND TRADEMARK OFFICE
CERTIFICATE OF CORRECTION

PATENT NO. : 4,188,268
DATED : February 12, 1980
INVENTOR(S) : Yujiro Sugahara et al.

It is certified that error appears in the above—identified patent and that said Letters Patent is hereby corrected as shown below:

Column 34, Claim 6, line 23, "is" should read -- in --.

Signed and Sealed this

Tenth Day of June 1980

[SEAL]

Attest:

SIDNEY A. DIAMOND

Attesting Officer

Commissioner of Patents and Trademarks